(12) United States Patent
Lin et al.

(10) Patent No.: US 10,943,091 B2
(45) Date of Patent: Mar. 9, 2021

(54) FACIAL FEATURE POINT TRACKING METHOD, APPARATUS, STORAGE MEDIUM, AND DEVICE

(71) Applicant: TENCENT TECHNOLOGY (SHENZHEN) COMPANY LIMITED, Shenzhen (CN)

(72) Inventors: Mengran Lin, Shenzhen (CN); Xinliang Wang, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 88 days.

(21) Appl. No.: 16/542,005

(22) Filed: Aug. 15, 2019

(65) Prior Publication Data
US 2019/0370530 A1    Dec. 5, 2019

Related U.S. Application Data

(63) Continuation of application No. PCT/CN2018/088070, filed on May 23, 2018.

(30) Foreign Application Priority Data

Jun. 21, 2017 (CN) .......................... 201710473506.8

(51) Int. Cl.
| | | |
|---|---|---|
| *G06T 7/00* | (2017.01) | |
| *G06K 9/00* | (2006.01) | |
| *G06T 7/246* | (2017.01) | |

(52) U.S. Cl.
CPC ..... *G06K 9/00261* (2013.01); *G06K 9/00275* (2013.01); *G06T 7/248* (2017.01); *G06T 2207/30201* (2013.01)

(58) Field of Classification Search
CPC ..... G06K 9/00221–00315; G06T 2207/30201; G06T 7/20; G06T 7/246–251
See application file for complete search history.

(56) References Cited

U.S. PATENT DOCUMENTS

| | | | | |
|---|---|---|---|---|
| 9,355,302 B2 * | 5/2016 | He | ..................... | G06K 9/00288 |
| 10,740,925 B2 * | 8/2020 | Gupta | ....................... | G06T 7/13 |

(Continued)

FOREIGN PATENT DOCUMENTS

| | | |
|---|---|---|
| CN | 101169827 A | 4/2008 |
| CN | 103310204 A | 9/2013 |

(Continued)

OTHER PUBLICATIONS

Office Action dated Feb. 19, 2020 in Chinese Patent Application No. 201710473506.8 with partial English translation.

(Continued)

*Primary Examiner* — Sean T Motsinger
(74) *Attorney, Agent, or Firm* — Oblon, McClelland, Maier & Neustadt, L.L.P.

(57) ABSTRACT

In a method for facial feature point tracking, facial feature points of a face in a previous image of a to-be-tracked image are acquired in an image sequence. Facial feature point errors between the to-be-tracked image and the previous image are determined based on a preset error model and pixels in the to-be-tracked image. The facial feature point errors indicate differences between first coordinates of facial feature points in the to-be-tracked image, and second coordinates of facial feature points at corresponding positions in the previous image. The preset error model is trained based on facial feature points in a plurality of pairs of adjacent reference images. Further, the facial feature points of the face in the to-be-tracked image are determined based on the facial feature points of the face in the previous image and the (Continued)

facial feature point errors between the to-be-tracked image and the previous image.

20 Claims, 9 Drawing Sheets

(56) References Cited

U.S. PATENT DOCUMENTS

| | | | | |
|---|---|---|---|---|
| 10,812,717 | B2* | 10/2020 | Liang | G06T 7/70 |
| 10,869,028 | B2* | 12/2020 | Heo | G06K 9/6227 |
| 2008/0187175 | A1* | 8/2008 | Kim | G06T 7/38 |
| | | | | 382/103 |
| 2013/0038717 | A1* | 2/2013 | Reynolds | G06T 7/246 |
| | | | | 348/135 |
| 2014/0185924 | A1* | 7/2014 | Cao | G06K 9/6209 |
| | | | | 382/159 |
| 2014/0378171 | A1* | 12/2014 | Rudow | H04W 4/027 |
| | | | | 455/456.6 |
| 2015/0035825 | A1* | 2/2015 | Zhou | G06T 13/40 |
| | | | | 345/419 |
| 2016/0196665 | A1* | 7/2016 | Abreu | G06T 7/251 |
| | | | | 345/427 |
| 2017/0286801 | A1* | 10/2017 | Rampal | G06K 9/00261 |
| 2018/0098057 | A1* | 4/2018 | Heo | G06T 7/337 |
| 2019/0122404 | A1* | 4/2019 | Freeman | G06T 7/251 |
| 2019/0251337 | A1* | 8/2019 | Liang | G06T 7/248 |
| 2019/0325256 | A1* | 10/2019 | Van Bree | G06K 9/00261 |
| 2019/0370530 | A1* | 12/2019 | Lin | G06T 7/246 |
| 2020/0219268 | A1* | 7/2020 | Liu | G06K 9/6274 |

FOREIGN PATENT DOCUMENTS

| | | | |
|---|---|---|---|
| CN | 103400395 | A | 11/2013 |
| CN | 104036240 | A * | 9/2014 |
| CN | 104036240 | A | 9/2014 |
| CN | 104182718 | A | 12/2014 |
| CN | 105678702 | A | 6/2016 |
| JP | 2012-123376 | A | 6/2012 |

OTHER PUBLICATIONS

International Search Report dated Aug. 13, 2018 in PCT/CN2018/088070, with English translation.
Written Opinion dated Aug. 13, 2018 in PCT/CN2018/088070.

* cited by examiner

US 10,943,091 B2

FACIAL FEATURE POINT TRACKING METHOD, APPARATUS, STORAGE MEDIUM, AND DEVICE

RELATED APPLICATION

This application is a continuation of International Application No. PCT/CN2018/088070, filed on May 23, 2018, which claims priority to Chinese Patent Application No. 201710473506.8, filed on Jun. 21, 2017. The entire disclosures of the prior applications are hereby incorporated by reference in their entirety.

FIELD OF THE TECHNOLOGY

Embodiments of this application relate to the field of image recognition technologies, and in particular, to a facial feature point tracking method, an apparatus, a storage medium, and a device.

BACKGROUND OF THE DISCLOSURE

To simulate a behavior of manually recognizing an image, an image recognition technology rises to the occasion. The image recognition technology is a technology of processing, analyzing and understanding an image by using a computer, is an important field of artificial intelligence, and is widely applied to scenarios such as facial feature point tracking, spam image filtering, and landform or landscape matching.

Using facial feature point tracking as an example, reference facial feature points may be obtained according to a large quantity of marked sample images of facial feature points, and a feature point tracking model may be obtained according to the reference facial feature points, so that the feature point tracking model can reflect relationships between facial feature points in any image and the reference facial feature points, thereby obtaining facial feature points of a current image based on the feature point tracking model.

In an actual scenario, facial feature points are usually different and continuously change in a plurality of consecutive frames of images in a video. However, when facial feature points of a plurality of consecutive frames of images are tracked by using the related technology, because facial feature points of each frame of image (frame of image is also referred to as image) are all obtained according to reference facial feature points, tracking of the facial feature points is greatly limited, and the tracked facial feature points cannot accurately express real facial features.

SUMMARY

Embodiments of the present application provide a facial feature point tracking method, an apparatus, a storage medium, and a device, capable of resolving problems that because facial feature points of each frame of image are all obtained according to reference facial feature points, tracking of the facial feature points is greatly limited, and the tracked facial feature points cannot accurately express real facial features. The technical solutions are as follows:

According to an aspect, a method and an apparatus for facial feature point tracking are provided. In the disclosed method that is implemented by the apparatus for example, facial feature points of a face in a previous image of a to-be-tracked image are acquired in an image sequence. In addition, facial feature point errors between the to-be-tracked image and the previous image are determined based on a preset error model and pixels in the to-be-tracked image. The facial feature point errors indicate differences between first coordinates and second coordinates, where the first coordinates are coordinates of facial feature points of the face in the to-be-tracked image, and the second coordinates are coordinates of facial feature points of the face at corresponding positions in the previous image. The preset error model is trained based on facial feature points in a plurality of pairs of adjacent reference images. The preset error model is used to indicate a relationship between pixels of a second reference image in each of the plurality of pairs of adjacent reference images and facial feature point errors between the second reference image and a first reference image in each of the plurality of pairs of adjacent reference images. The facial feature points of the face in the to-be-tracked image are determined based on the facial feature points of the face in the previous image and the facial feature point errors between the to-be-tracked image and the previous image.

In the disclosed method, offsets are determined between the first coordinates of the facial feature points in the previous image and the second coordinates of the facial feature points in the to-be-tracked image based on the facial feature point errors. The first coordinates of the facial feature points of the face in the to-be-tracked image are obtained subsequently based on the second coordinates of the facial feature points of the face in the previous image and the determined offsets.

In the disclosed method, the plurality of pairs of adjacent reference images are split into a plurality of sample classes based on a preset threshold and a pair of pixels in a selected position of a selected area from the second reference image of each of the plurality of pairs of adjacent reference images. Each of the plurality of sample classes includes facial feature points of the first reference image and facial feature points of the second reference image of the plurality of pairs of adjacent reference images in the respective sample class. In addition, reconstructed facial feature point errors corresponding to each of the plurality of sample classes are determined, where the reconstructed facial feature point errors indicate differences between third coordinates of the facial feature points of the second reference image in each of the plurality of sample classes and estimated facial feature point coordinates. The estimated facial feature point coordinates are determined based on the facial feature points of the first reference image in each of the plurality of sample classes. Further, the preset error model is obtained based on the reconstructed facial feature point errors corresponding to each of the plurality of sample classes.

In some embodiments, before the preset error model is obtained, estimated facial feature points of the second reference image in each of the plurality of sample classes are updated based on the reconstructed facial feature point errors corresponding to the respective sample class. Subsequently, a preset number of new positions are selected in the selected area for each of the plurality of sample classes. The plurality of pairs of adjacent reference images are then split into an additional plurality of sample classes according to the selected new positions. Further, corresponding reconstructed facial feature point errors are determined for each of the additional plurality of sample classes.

In some embodiments, before the preset error model is obtained, a preset number of new areas in each of the plurality of sample classes are selected as the selected areas. The plurality of pairs of adjacent reference images are then split into an additional plurality of sample classes according to the selected new areas. Further, corresponding reconstructed facial feature point errors are determined for each of the additional plurality of sample classes.

In the disclosed method, initial facial feature point errors are determined corresponding to the selected area of the second reference image in each of the plurality of sample classes, where the initial facial feature point errors indicate the differences between the third coordinates of the facial feature points of the second reference image and the estimated facial feature point coordinates. The preset error model is obtained based on the initial facial feature point errors and the reconstructed facial feature point errors corresponding to each of the plurality of sample classes.

In some embodiments, the plurality of pairs of adjacent reference images are split according to a plurality of splitting manners based on the preset threshold and a plurality of pixel pairs to obtain a corresponding plurality of sample classes in a respective splitting manner. Each of the plurality of pixel pairs is selected at a respective selected position in the selected area of the second reference image in each of the plurality of sample classes. A splitting similarity is subsequently determined for each of the plurality of splitting manners based on facial feature points of the corresponding plurality of sample classes in the respective splitting manner. The splitting similarity indicates a similarity between two respective sample classes in one of the corresponding plurality of sample classes in the respective splitting manner. A splitting manner is selected from the plurality of splitting manners that has a splitting similarity to meet a preset condition. Further, a corresponding plurality of sample classes in the splitting manner is applied as the plurality of sample classes, and a position of a pair of pixels corresponding to the splitting manner is applied as the selected position.

In the disclosed method, a facial area is determined in the to-be-tracked image based on the second coordinates of the facial feature points in the previous image. In addition, based on the preset error model and the pixels in the facial area, the facial feature point errors are determined between the to-be-tracked image and the previous image.

According to another aspect, a non-transitory computer-readable medium storing instructions which when executed by a computer cause the computer to perform any of the methods for facial feature point tracking which are mentioned above.

In the embodiments of this application, facial feature points in a previous frame of image are obtained, and facial feature point errors between a to-be-tracked frame of image (or to-be-tracked image) and the previous frame of image (or previous image) may be obtained based on a preset error model and pixels in the to-be-tracked frame of image, and facial feature points of the to-be-tracked frame of image are obtained based on the facial feature points of the previous frame of image and the facial feature point errors. Because facial feature points of adjacent frames of images (or adjacent reference images) continuously change, the facial feature points of the to-be-tracked frame of image may be more accurately estimated by referring to the facial feature points of the previous frame of image.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes the implementations of this application in detail with reference to the accompanying drawings.

Figure 1:
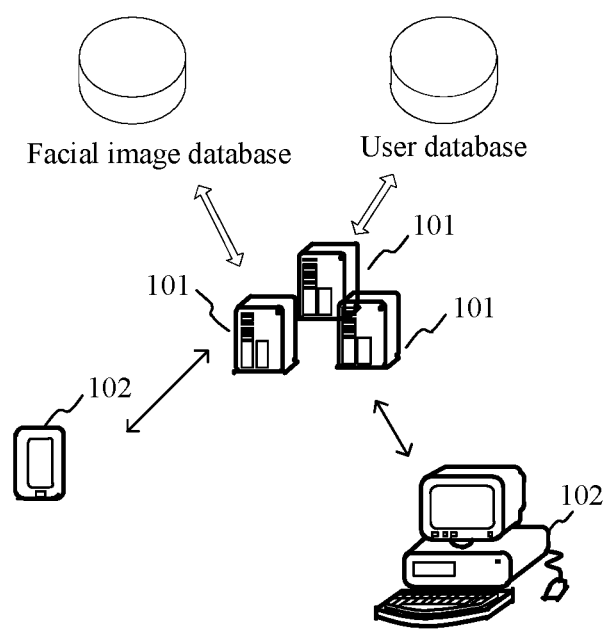
FIG. 1 is a schematic diagram of an implementation environment of a facial feature point tracking method according to an embodiment of this application.

FIG. 1 is a schematic diagram of an implementation environment of a facial feature point tracking method according to an embodiment of this application. Referring to FIG. 1, the implementation environment includes:

at least one server 101 and at least one terminal 102. The server 101 may be a server providing an image service, and the terminal 102 may be a terminal of a user served by the server. In a possible application scenario, an image application, a social application, a game application, or the like provided by the server 101 may be installed on the terminal 102, so that the terminal 102 can interact with the server 101 based on the installed application.

In the embodiments of this application, the server 101 may be configured to obtain a preset error model and send the preset error model to the terminal 102, so that the terminal 102 can store the preset error model and perform tracking based on the preset error model to obtain facial feature points when using a facial feature point tracking function of an application.

In addition, at least one database, such as a face image database and a user database, may be further configured for the server 101. The face image database is configured to store face images, facial feature points in marked face images, and facial feature points of a previous frame of image of a simulated face image. The user database is configured to store personal data, such as a username and a password, of a user served by the server 101.

Figure 2:
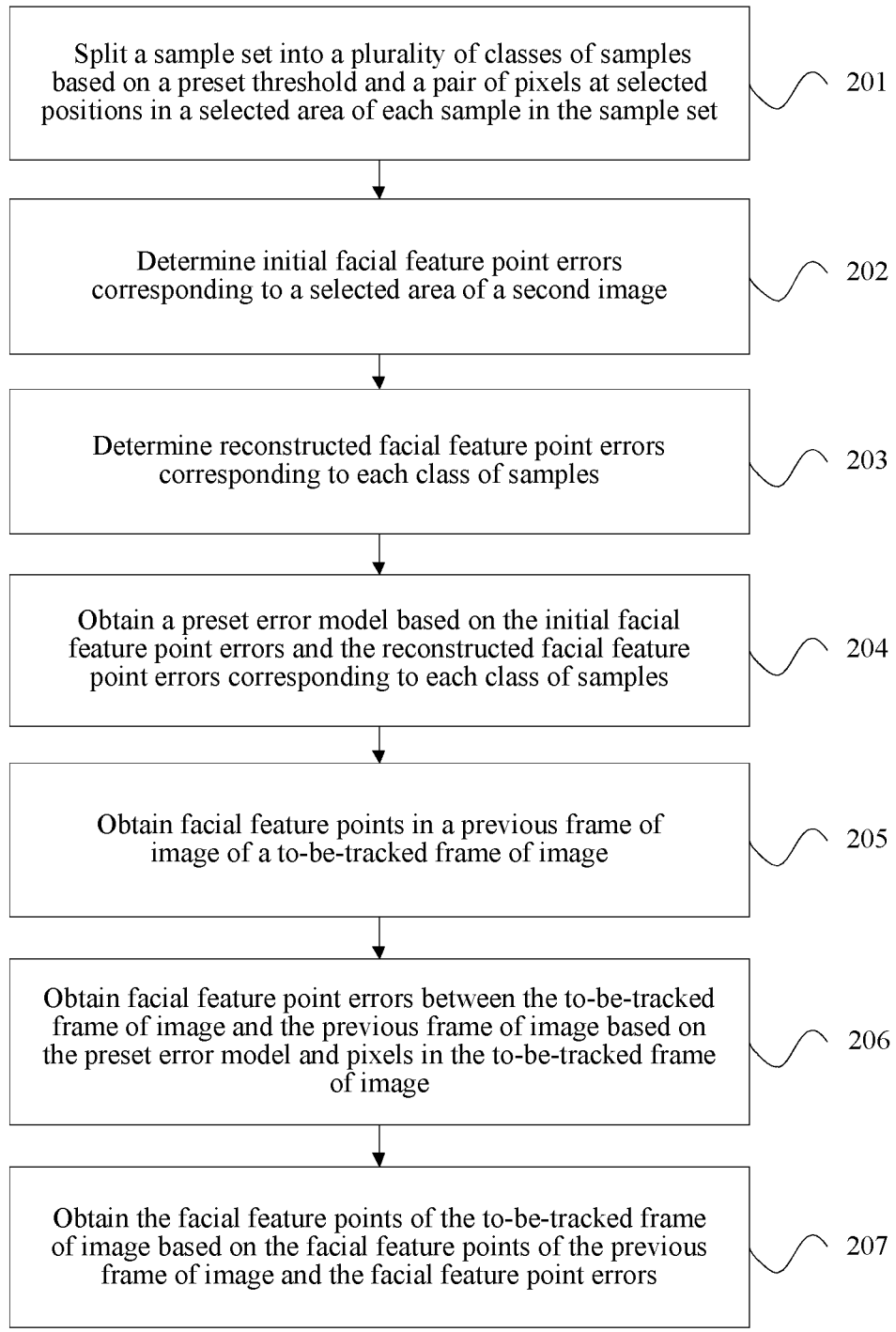
FIG. 2 is a flowchart of a facial feature point tracking method according to an embodiment of this application.

FIG. 2 is a flowchart of a facial feature point tracking method according to an embodiment of this application. Referring to FIG. 2, the method may be applied to any electronic device such as a server or a terminal. In an example in which a terminal is an execution body, the method may include the following model training processes and model application processes. Steps 201 to 205 are a process of obtaining a preset error model by training a plurality of pairs of adjacent frames of images, and steps 205 to 207 are a facial feature point tracking process when the foregoing preset error model is applied.

201: Split a sample set (or the plurality of pairs of adjacent reference images) into a plurality of classes of samples (or sample classes) based on a preset threshold and a pair of pixels at selected positions in a selected area in a second image of each sample in the sample set, where each sample in the sample set includes facial feature points of a first image (or first reference image) that is a former one and facial feature points of the second image (or second reference image) that is a latter one in adjacent frames of images (or adjacent reference images).

To implement subsequent accurate facial feature point tracking, in this embodiment of this application, a change pattern of the facial feature points between former and later frames of images is found by collecting a sample set and performing model training based on the sample set. A facial feature point is a point in an image that represents a facial feature, for example, a point that represents a facial feature or a face contour feature, and is usually represented in a form of coordinates. Samples can be obtained in various ways. For example, to ensure reliability of a sample set and improve accuracy of a preset error model, a plurality of pairs of adjacent frames of images may be extracted from a video including a face, and facial feature points manually marked in the plurality of pairs of adjacent frames of images are obtained as samples, where a pair of adjacent frames of images includes two adjacent images in the video. Alternatively, to save labor costs and improve efficiency of obtaining a sample set, a single face image may be obtained, facial feature points may be manually marked on the single face image, and further, facial feature points of a previous frame of image of the single face image are simulated based on distribution of the facial feature points in the single face image, thereby obtaining facial feature points of a pair of adjacent frames of images as one sample, where a method of simulating facial feature points is not limited to the Monte Carlo method.

Figure 3:
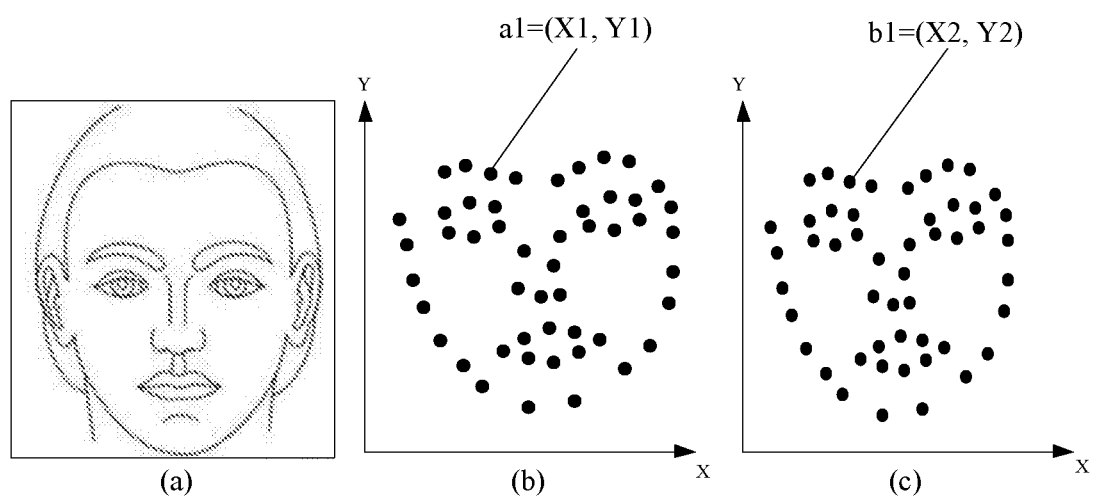
FIG. 3 is a schematic diagram of feature facial points according to an embodiment of this application.

It should be noted that "first" and "second" do not mean comparing quantities of facial feature points, but are used to represent a chronological order of images corresponding to the facial feature points, and the facial feature points of the second image may be facial feature points of a single face image, or a facial feature point of a frame of image following the first frame of image in a video including a face; The facial feature points of the first image may be the facial feature points of the previous frame of image of the second image or the facial feature points of the previous frame of image simulated based on the facial feature points of the second image. For example, FIG. 3 is a schematic diagram of feature facial points according to an embodiment of this application. FIG. 3(a) shows a second image, FIG. 3(b) shows facial feature points of the second image, and FIG. 3(c) shows facial feature points of a first image simulated based on the facial feature points of the second image. The facial feature points shown in both FIG. 3(b) and FIG. 3(c) may all be represented in a form of coordinates of facial feature points. For example, facial feature points of the second image are S1=(a1, a2, a3 . . . ), facial feature points of the first image are S2=(b1, b2, b3 . . . ), each parameter in S1 or S2 is coordinates of one facial feature point, for example, a1=(X1, Y1) and b1=(X2, Y2), and a plurality of parameters in S1 or S2 may represent complete facial feature points. It should be noted that a quantity of coordinates of facial feature points required for representing complete facial feature points is not limited in this embodiment of this application. For example, if the quantity is 30, a model training or facial feature point tracking process is equivalent to processing coordinates of 30 facial feature points, to present facial feature points that change.

In a possible application scenario, to occupy less storage resources of a terminal, facial feature points of adjacent frames of images may be stored in a face image database of a server, and at a beginning of training, the terminal obtains, from the face image database, a sample set including facial feature points of adjacent frames of images.

In this step, a preset threshold is used as a standard for splitting a sample set, samples having large facial feature point differences are classified into different classes of samples, and samples having similar facial feature points are classified into a same class of samples. Selected positions are positions respectively corresponding to any two pixels in a selected area in the second image. A size of the selected area and positions in the second image are not limited in the embodiments of this application provided that the size of the selected area is not greater than an area of the second image. Considering that there are usually differences in pixels of different images at the same position, a pair of pixels of each second image at selected positions may be used as a feature of a sample, and the sample set is classified according to the feature. Since the sample is obtained according to at least a single second image, splitting may be performed based on pixels of the second image.

When splitting is performed based on the pixels of the second image, a difference between gray levels (a gray level difference for short below) of a pair of pixels may be used as a feature of the sample. In this step, for each second image, the terminal may obtain pixel information of the second image, where the pixel information at least includes a position and a gray level of a pixel, determine a gray level difference of a pair of pixels of the second image at selected positions, compare the gray level difference corresponding to the second image with a preset threshold corresponding to the $n^{th}$ splitting in splitting levels, if the gray level difference is less than the preset threshold, split the sample to which the second image belongs into one class corresponding to the $n^{th}$ splitting, and if the gray level difference is not less than the preset threshold, split the sample to which the second image belongs into another class corresponding to the $n^{th}$ splitting. It should be noted that a splitting level and a quantity of preset thresholds are not limited in this embodiment of this application. The splitting level is used to indicate fineness of classification, and splitting of each level is performing splitting again based on respective samples obtained by splitting of a higher level. Based on a specified splitting level, the terminal may use various samples obtained by splitting of a last level as a plurality of classes of samples.

For example, if a splitting level is 2, the terminal may perform splitting of a first level: comparing a gray level difference between a pair of pixels of one second image at selected positions with a preset threshold a, if the gray level difference is less than the preset threshold a, classify a sample to which the second image belongs into a class 1, and if the gray level difference is not less than the preset threshold a, classify the sample to which the second image belongs into a class 2; and proceed to perform splitting of a second level based on the class 1 and the class 2 that are obtained by the splitting of the first level: comparing a gray level difference of a second image in a sample in the class 1 with a preset threshold b, if the gray level difference is less than the preset threshold b, classifying the sample to which the second image belongs in the class 1 into a class 11, and if the gray level difference is not less than the preset threshold b, classifying the sample to which the second image belongs in the class 1 into a class 12; and comparing a gray level difference of a second image in a sample in the class 2 with a preset threshold c, if the gray level difference is less than the preset threshold c, classifying the sample to which the second image belong in the class 2 into a class 21, and if the gray level difference is not less than the preset threshold c, classifying the sample to which the second image belongs in the class 2 into a class 22. Therefore, the terminal may obtain the class 11, the class 12, the class 21, and the class 22.

Figure 4:
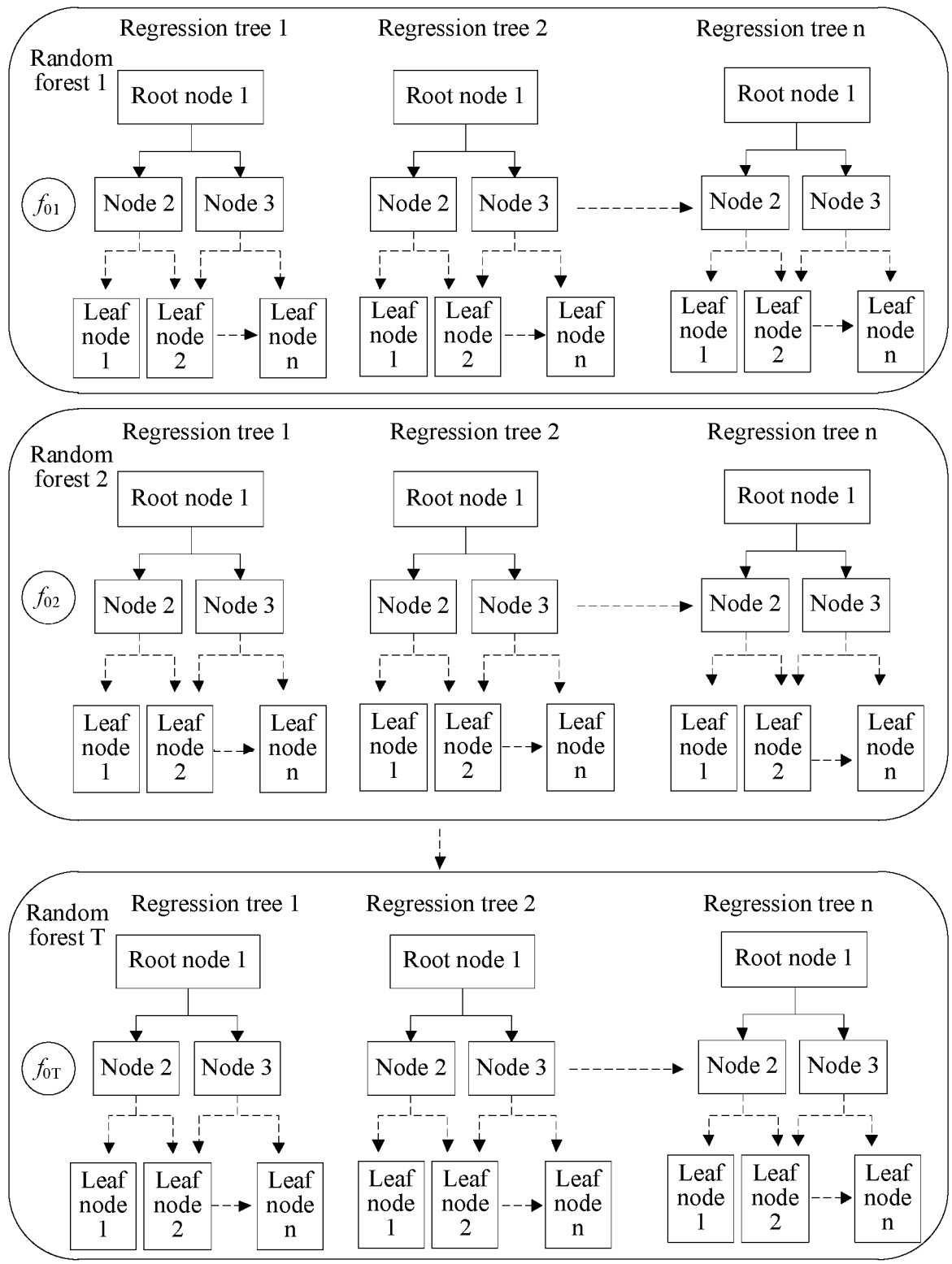
FIG. 4 is a schematic diagram of a data structure according to an embodiment of this application.

A data structure of the preset error model may be a random forest, and then, the splitting process may serve as a process of generating a regression tree in the random forest. Referring to FIG. 4, this embodiment of this application provides a schematic diagram of a data structure. In the schematic diagram, the preset error model is constituted by T (T being 1 is as an example in this example) random forests for description, where one random forest may be constituted by at least one regression tree, one regression tree may possess a plurality of nodes, every node, except a leaf sub-node, may correspond to one preset threshold, and a class of samples may be obtained from a leaf sub-node of a regression tree. In a splitting process, the terminal first compares a gray level difference corresponding to each second image with a preset threshold at a root node of a regression tree, if the gray level difference is less than the preset threshold, the second image is split to a left sub-node (or a right sub-node), and if the gray level difference is not less than the preset threshold, the second image is split to a right sub-node (or a left sub-node), to complete splitting of a level, until a leaf sub-node of the tree is reached, and a class of samples split to each leaf sub-node is obtained. Because each sample in a class of samples undergoes a same splitting process according to a corresponding gray level difference, facial feature points of samples in a class of samples have a specific similarity.

Considering that an image includes a plurality of pixels, representativeness of pixels at different positions in the image should be different. For example, a pair of pixels includes a pixel at a center of the image and a pixel at an edge of the image, and another pair of pixels includes two pixels at an edge of the image, and the pair of pixels may be more representative than the other pair of pixels. Therefore, to select a more representative pair of pixels at selected positions in the image, in a splitting manner corresponding to the pair of pixels, a degree of discrimination between samples in different classes of samples is higher, and a similarity between samples in same class of samples is higher, thereby improving accuracy of the preset error model. A splitting manner having a higher splitting purity (or similarity) may be selected from a plurality of splitting manners, and the splitting purity is used to indicate a similarity between samples in each class of samples in a splitting manner.

The process of selecting a splitting manner is: splitting, by the terminal, a sample set in different manners based on a preset threshold and a plurality of pairs of pixels (or pixel pairs) at different selected positions in one selected area of a second image in each sample to obtain a plurality of classes of samples in each splitting manner; determining a splitting purity of each splitting manner based on facial feature points of the plurality of classes of samples in each splitting manner; and selecting a splitting manner having a splitting purity that meets a preset condition, using a plurality of classes of samples in the splitting manner as the finally obtained plurality of classes of samples, and using positions of a pair of pixels corresponding to the splitting manner as the selected positions.

In the selection process, the preset condition is not limited to a splitting manner having a highest splitting purity. The terminal may randomly select a plurality of pairs of pixels from the one selected area. For example, if there are positions 1 to 10 in one selected area, pixels at the position 1 and the position 3 may be selected as a pair of pixels, pixels at the position 2 and position 6 may be selected as a pair of pixels, and so on. The terminal further performs splitting based on each pair of pixels, and a splitting process is the same as the foregoing splitting process based on the selected positions. It should be noted that a manner of obtaining a splitting purity is not limited in this embodiment of this application. For example, the splitting purity may be obtained according to a variance of facial feature points in each class of samples in a current splitting manner, and then, if a similarity between samples in each class of samples is higher, a variance corresponding to the class of samples is smaller, indicating a higher splitting purity. For a process of obtaining a splitting purity, refer to Formula 2:

$$E(Q, \theta) = \sum_{S \in \{r,l\}} \sum_{i \in Q_{\theta,S}} \|r_i - \mu_S\|^2, \quad \text{Formula 2}$$

$$\text{where } \mu_S = \frac{1}{|Q_{\theta,S}|} \sum_{i \in Q_{\theta,S}} r_i,$$

and $r_i$ is a difference between a facial feature point of a second image and a facial feature point of a first image in one sample $Q_{\theta,S}$ is a quantity of a class of samples, $\mu_S$ is an average of differences of facial feature points corresponding to each sample in the class of samples, $\theta$ represents a current splitting manner, i represents a label of one sample in a class of samples to which the one sample belongs, S represents a class of samples, r represents a right node, and l represents a left node.

202: Determine initial facial feature point errors corresponding to a selected area of the second image, where the initial facial feature point errors are used to indicate differences between third coordinates of the facial feature points of the second image and estimated facial feature point coordinates.

Because changes of facial feature points of adjacent frames of images are continuous, and facial feature points in temporal sequential order are highly correlated, to improve accuracy of tracking facial feature points in adjacent frames of images, in this embodiment of this application, the facial feature points of the first image are used as initial estimates of the facial feature points of the second image, and a preset error mode is obtained based on differences between the facial feature points of the two images.

In this step, the terminal may use fourth coordinates of the facial feature points in the first image as estimated facial feature point coordinates of the corresponding second image, and analyze a general difference between third coordinates of the facial feature points in the second image and the estimated facial feature point coordinates, to obtain initial facial feature point errors. The initial facial feature point errors may be averages of differences between the third coordinates of the facial feature points in each second image and the fourth coordinates of the facial feature points at corresponding positions in the first image. That is, the initial facial feature point errors are averages of the differences between the third coordinates and the fourth coordinates of each facial feature point. For a calculation manner thereof, refer to Formula 1:

$$f_{01} = \frac{\sum_{i=1}^{N}(S_{i2} - S_{i1})}{N},$$ Formula 1 where $f_{01}$ represents an initial facial feature point error, N represents a quantity of the second images, i represents the $i^{th}$ pair of adjacent frames of images, $S_{i2}$ represents facial feature points of the $i^{th}$ second image, and $S_{i1}$ represents facial feature points of the $i^{th}$ first image. Using S1 and S2 in FIG. 3 as an example, coordinates with a same label may be coordinates of a pair of facial feature points at corresponding positions, then, a1 and b1 are coordinates of a pair of facial feature points at corresponding positions, and a difference therebetween is (X1-Y1, X2-Y2). When $f_{01}$ is obtained, X-axis coordinate values in respective differences can be averaged as an X-axis coordinate value of $f_{01}$, and Y-axis coordinate values in respective differences can be averaged as a Y-axis coordinate value of $f_{01}$, thereby obtaining coordinates of $f_{01}$. A manner of processing coordinates of the facial feature points in this embodiment of this application is the same to the manner herein.

It should be noted that the step 202 is an optional step in this embodiment of this application. In fact, even though the initial facial feature point errors are not determined, facial feature point errors may be reconstructed according to the classified samples and the facial feature points of the first image, to obtain the preset error model, thereby improving accuracy of a facial feature point tracking process.

203: Determine reconstructed facial feature point errors corresponding to each class of samples, where the reconstructed facial feature point errors are used to indicate differences between third coordinates of facial feature points of a second image in a class of samples and estimated facial feature point coordinates, and the estimated facial feature point coordinates are determined based on facial feature points of a first image in the class of samples.

The estimated facial feature point coordinates may be determined in various manners. For example, fourth coordinates of facial feature points of a first image are used as estimated facial feature point coordinates of a corresponding second image, or according to the obtained initial facial feature point errors, the terminal may determine estimated facial feature point coordinates of a second image in a pair of adjacent frames of images with reference to fourth coordinates of facial feature points of a first image in the pair of adjacent frames of images, for example, add respective coordinates of the facial feature point of the first image with corresponding coordinate differences in the initial facial feature point errors to obtain estimated facial feature point coordinates of the second image. Estimated facial feature points of the second image that are obtained for the first time by combining the facial feature points of the first image with the initial facial feature point errors are subjected to transition of the initial facial feature point errors, and can be closer to real facial feature points of the second image, so that the preset error model obtained based on the estimated facial feature points is more accurate.

Although the estimated facial feature points of the second image have been obtained, there should be some differences between the estimated facial feature points and the real facial feature points. To make the estimated facial feature points closer to the real facial feature points, each class of samples is analyzed in this step, to determine differences between facial feature points of a second image and estimated facial feature points in the class of samples.

When each class of samples is analyzed to determine differences between facial feature points of a second image and estimated facial feature points in the class of samples, the terminal may use averages of differences between third coordinates of facial feature points of each second image in the class of samples and the estimated facial feature point coordinates as the reconstructed facial feature point errors. For a calculation process, refer to Formula 3:

$$X_n = \frac{\sum_{a=1}^{A}(S_{ar} - S_{ae})}{A},$$ Formula 3 where $X_n$ represents reconstructed facial feature point errors corresponding to the $n^{th}$ class of samples, A represents a quantity of second images in the $n^{th}$ class of samples, $S_{ar}$ represents third coordinates of facial feature points in the $a^{th}$ second image, and $S_{ae}$ represents estimated facial feature point coordinates of the $a^{th}$ second image.

According to the foregoing method for determining the reconstructed facial feature point errors, reconstructed facial feature point errors corresponding to each leaf node of one regression tree can be obtained.

204: Obtain a preset error model based on the initial facial feature point errors and the reconstructed facial feature point errors corresponding to each class of samples.

In this step, the preset error model obtained through training may have various forms. For example, the preset error model is a weighted form of the initial facial feature point errors and reconstructed facial feature points, and then, when the preset error model is used, differences between facial feature points of a frame of image and those in a previous frame of image can be obtained. The preset error model may be: $E(I)=f_{01}+g_1(I)$, where E represents facial feature point errors between a frame of image and a previous frame of image thereof, $f_{01}$ represents initial facial feature point errors, I represents is pixels at the selected positions, in a frame of image, that are used for classifying samples, and $g_1(I)$ represents reconstructed facial feature point errors corresponding to a class of samples to which a frame of image belongs is split based on the pixels at the selected positions.

For another example, the preset error model is a weighted form of initial facial feature point errors, reconstructed facial feature point errors, and facial feature points of a previous frame of image of a frame of image (as an independent variable to be input in the preset error model), and when the preset error model is used, estimated facial feature points of a frame of image can be obtained. The preset error model may be: $S_t=S_{t-1}\pm f_{01}+g_1(I)$, where $S_t$ represents estimated facial feature points of a frame of image, $S_{t-1}$ represents facial feature points of a previous frame of image of a frame of image, and definitions of $f_{01}$ and $g_1(I)$ are the same as the foregoing ones.

It should be noted that this step is an optional step of obtaining a preset error model based on reconstructed facial feature point errors corresponding to each class of samples. In fact, if the terminal does not determine initial facial feature point errors, the preset error model may still be obtained based on reconstructed facial feature point errors corresponding to each class of samples. For example, the preset error model is a weighted form of the reconstructed facial feature point errors corresponding to each class of samples, and may be expressed as: $S_t=S_{t-1}+g_1(I)$.

In a possible application scenario, to make the preset error model more accurate, a training process may be continued alternatively based on the reconstructed facial feature point errors obtained in step 203. For an implementation process, refer to the following steps (1) to (3):

(1) For each class of samples, update estimated facial feature points of each second image in the class of samples based on reconstructed facial feature point errors corresponding to the class of samples.

In the step (1), using the subsequent step 203 as an example, the terminal may add estimated facial feature points of each second image with reconstructed facial feature point errors corresponding to a class of samples to which the second image belongs, to obtain updated estimated facial feature points of the second image.

If the reconstructed facial feature point errors obtained in the first calculation are used as first reconstructed facial feature point errors, the step (1) may be represented as: updating estimated facial feature points of each second image based on the first reconstructed facial feature point errors, where the first reconstructed facial feature point errors are reconstructed facial feature point errors corresponding to each class of samples split based on a pair of pixels at selected positions in a second image of each sample in the sample set.

Still using the subsequent step 203 as an example, the terminal may use the reconstructed facial feature point errors corresponding to each class of samples obtained in step 203 as the first reconstructed facial feature point errors, and add estimated facial feature point coordinates of each second image with reconstructed facial feature point errors corresponding to a class of samples to which the second image belongs, to obtain updated estimated facial feature points of the second image.

(2) Re-select one position in a selected area as the selected position.

The step (2) is equivalent to updating the selected positions in the step 201. For example, the selected area includes positions 1 to 10, and in step 201, the position 1 and the position 3 are selected as the selected position. In the step (2), two positions may be selected from the remaining 8 positions as the selected positions. For example, the position 2 and the position 7 are selected as the selected positions.

(3) Continuously perform the steps of splitting the sample set into a plurality of classes of samples based on a preset threshold and a pair of pixels at selected positions in a selected area in a second image of each sample in the sample set and determining reconstructed facial feature point errors corresponding to each class of samples until the reconstructed facial feature point errors corresponding to each class of samples that is split based on the pair of pixels at respective selected positions are determined.

The step (3) may be understood as continuously performing steps 201 and 203 until the reconstructed facial feature point errors corresponding to each class of samples that is split based on the pair of pixels at respective selected positions are determined. It should be noted that if the terminal performs step 202 between steps 201 and 203, the step (3) may alternatively be replaced with: Continuously perform the steps of splitting the sample set into a plurality of classes of samples based on a preset threshold and a pair of pixels at selected positions in a selected area in a second image of each sample in the sample set, determining initial facial feature point errors corresponding to the selected area of the second image, and determining reconstructed facial feature point errors corresponding to each class of samples until the reconstructed facial feature point errors corresponding to each class of samples that is split based on the pair of pixels at respective selected positions are determined.

In a possible application scenario, selected positions that are selected for the first time may be referred to as first positions, selected positions that are selected for the second time are referred to as second positions, and so on. The step (3) may alternatively be replaced with: splitting the sample set into a plurality of classes of samples based on a preset threshold and a pair of pixels at second positions in a selected area of the second image in each sample; determining second reconstructed facial feature point errors until reconstructed facial feature point errors corresponding to each class of samples split based on pixels at respective positions in the selected area are determined, where the second reconstructed facial feature point errors are reconstructed facial feature point errors corresponding to each class of samples split based on a pair of pixels at the second positions.

An implementation process of the step (3) is similar to an implementation process of step 203 and a difference is that: in step (3), the terminal needs to determine the reconstructed facial feature point errors based on the updated estimated facial feature points. After determining the second reconstructed facial feature point errors, the terminal may continuously determine reconstructed facial feature point errors according to steps (1) to (3), for example, update estimated facial feature points of a second image based on the second reconstructed facial feature point errors; and split a sample set based on a preset threshold and a pair of pixels at third positions, and determine third reconstructed facial feature point errors until a quantity of reconstructed facial feature point errors are determined based on a specified quantity of pixels at selected positions in a selected area, where a preset error model may be obtained based on (initial facial feature point errors and) reconstructed facial feature point errors corresponding to each class of samples split based on each pair of pixels.

It can be learned from the foregoing process of determining reconstructed facial feature point errors that estimated facial feature points of the second image are continuously updated along with processes of determining reconstructed facial feature point errors, and when a reconstructed facial feature point error is determined, the estimated facial feature points need to be updated based on a previous reconstructed facial feature point error, to obtain the updated estimated facial feature points, thereby obtaining a reconstructed facial feature point error based on the updated estimated facial feature points.

The preset error model obtained based on steps (1) to (3) not only may be a weighted form of initial facial feature point errors and respective reconstructed facial feature points, but also may be a weighted form of initial facial feature point errors, reconstructed facial feature point errors, and facial feature points of a previous frame of image of a frame of image. The latter preset error model is used as an example, and it may be Formula 4:

$$S_t = S_{t-1} + f_{01} + \Sigma_{k=1}^{K} g_k(I), \text{ where} \qquad \text{Formula 4:}$$

K represents a quantity of selected positions in the one selected area when the selected positions are used for classifying samples, k represents a label of selected positions in one selected area, $g_k(I)$ represents reconstructed facial feature point errors corresponding to a class of samples into which a frame of image is classified based on pixels at the $k^{th}$ selected positions, and other parameters are the same as those in the foregoing preset error model.

Processes of estimating, updating, and obtaining differences are continuously repeated in the foregoing training process, so that the obtained facial feature point errors can continuously approach facial feature point differences between two adjacent frames of images. In an example in which a data structure of the preset error model is a random forest, the training process is equivalent to: obtaining reconstructed facial feature point errors based on a previous regression tree in the random forest, updating estimated facial feature points of a second image, and generating a current regression tree based on the updated estimated facial feature points. Referring to the data structure of FIG. 4, a regression tree may be generated based on a pixel at one selected position, and the regression tree is used to classify an image according to a preset threshold and the pixel at the one selected position into a class of samples in a plurality of classes of samples.

The preset error models obtained above are all based on a random forest that is used as an example for description. In a possible application scenario, the preset error model may alternatively be obtained based on a plurality of random forests, and an obtaining process may be subsequent to the foregoing steps (3) and proceed to the following steps (4) and (5):

(4) Re-select one area in a sample as a selected area.

The step (4) is equivalent to updating the selected area in the step 201. For example, the selected area in step 201 is a central area of a second image, and a selected area in the step (4) is an edge area in the second image.

(5) Continuously perform the steps of splitting the sample set into a plurality of classes of samples based on a preset threshold and a pair of pixels at selected positions in a selected area in a second image of each sample in the sample set and determining reconstructed facial feature point errors corresponding to each class of samples, and stopping after determining reconstructed facial feature point errors corresponding to each class of samples split based on a pair of pixels at selected positions in each selected area.

The step (4) may be understood as continuously performing steps 201 and 203 until the reconstructed facial feature point errors corresponding to each class of samples that is split based on the pair of pixels at selected positions in each selected area are determined. It should be noted that if the terminal performs step 202 between steps 201 and 203, the step (4) may alternatively be replaced with: Continuously perform the steps of splitting the sample set into a plurality of classes of samples based on a preset threshold and a pair of pixels at selected positions in a selected area in a second image of each sample in the sample set, determining initial facial feature point errors corresponding to the selected area of the second image, and determining reconstructed facial feature point errors corresponding to each class of samples until the reconstructed facial feature point errors corresponding to each class of samples that is split based on the pair of pixels at selected positions in each selected area are determined.

In a possible application scenario, a selected area that is selected for the first time may be referred to as a first area, a selected area that is selected for the second time is referred to as a second area, and so on. The step (4) may alternatively be replaced with: determining a plurality of reconstructed facial feature point errors corresponding to the second area based on pixels at selected position in the second area, other than the first area, in a second image of each sample in a sample set until the reconstructed facial feature point errors corresponding to pixels in each selected area in the second image are determined.

In the step (5), the terminal may split a sample set into a plurality of classes of samples based on each pair of pixels in the second area, and determine reconstructed facial feature point errors corresponding to each class of samples, where a splitting process thereof is the same as that in step 201, and a determining process thereof is the same as that in step 203. After the plurality of reconstructed facial feature point errors corresponding to the second area is determined, the terminal may determine reconstructed facial feature point errors corresponding to a third area based on the pixels at selected positions in the third area until when reconstructed facial feature point errors respectively corresponding to a preset quantity of selected areas are obtained, a preset error model may be obtained based on (initial facial feature point errors corresponding to each selected area and) reconstructed facial feature point errors corresponding to each selected area.

It should be noted that when reconstructed facial feature point errors corresponding to each selected area are determined, the terminal may select a plurality of selected positions in each area, and determine one reconstructed facial feature point error for each selected position. Refer to description in steps (1) to (3) for details.

In this embodiment of the present application, before reconstructed facial feature point errors are determined based on pixels of a sample set in each selected area, initial facial feature point errors corresponding to the selected are may be determined, and the determining process is the same as the step 202. However, for a selected area (for example, the second selected area) following the first selected area, because estimated facial feature points are continuously updated along with processes of determining reconstructed facial feature point errors, when reconstructed facial feature point errors corresponding to one selected area are determined, facial feature points of the second image may be updated based on reconstructed facial feature point errors obtained according to a last pair of pixels in a previous selected area, to obtain estimated facial feature points that have been updated based on respective reconstructed facial feature point errors corresponding to the previous selected area (equivalent to being obtained based on reconstructed facial feature point errors of a last regression tree in a previous random forest). That is, initial facial feature point errors are obtained according to fourth coordinates of facial feature point in a first image and reconstructed facial feature point errors corresponding to each class of sample to which a sample of the first image belongs. For example, reconstructed facial feature point errors obtained according to a last pair of pixels in the first area are added with estimated facial feature point coordinates of a second image after a previous update, to obtain currently updated estimated facial feature point coordinates, and initial facial feature point errors are obtained based on facial feature points of the second image and the currently updated estimated facial feature point coordinates.

A manner of calculating initial facial feature point errors corresponding to a specific area may be the same as Formula 1, and may be, for example, Formula 5:

$$f_{0t} = \frac{\sum_{i=1}^{N}(S_{ir} - S_{ie})}{N},$$ Formula 5 where
- $f_{0t}$ represents initial facial feature point errors corresponding to the $t^{th}$ selected area, which are equivalent to initial facial feature point errors in the $t^{th}$ random forest, N represents a quantity of second images, i represents the $i^{th}$ second image, $S_{ir}$ represents facial feature points of the $i^{th}$ second image, and $S_{ie}$ represents estimated facial feature points of the $i^{th}$ second image.

The preset error model not only may be a weighted form of respective initial facial feature point errors and respective reconstructed facial feature points, but also may be a weighted form of initial facial feature point errors, reconstructed facial feature point errors, and facial feature points of a previous frame of image of a frame of image. The former preset error model is used as an example, and it may be Formula 6:

$$E(I) = \sum_{t=1}^{T}(f_{0t} + \sum_{k=1}^{K} g_k(I)).$$ Formula 6:

The latter preset error model is used as an example, and it may be Formula 7:

$$S_t = S_{t-1} + \sum_{t=1}^{T}(f_{0t} + \sum_{k=1}^{K} g_k(I)),\ \text{where}$$ Formula 7:

T represents a quantity of selected areas, and is also equivalent to a quantity of random forests; t represents a label of a selected area, and is also equivalent to a label of a random forest; $f_{0t}$ represents initial facial feature point errors corresponding to a selected are whose label is t, and is also equivalent to initial facial feature point errors corresponding to the $t^{th}$ random forest; K represents a quantity of selected positions in one selected area that are used for classifying a sample, and is also equivalent to a quantity of regression trees in one random forest; k represents a label of a specific selected position in a selected area, and is also equivalent to a label of the $k^{th}$ regression tree; $g_k(I)$ represents reconstructed facial feature point errors corresponding to a class of samples into which a frame of image is classified based on pixels at the $k^{th}$ selected positions in the $t^{th}$ selected area; and I represents pixels of a frame of image at the $k^{th}$ selected positions in the $t^{th}$ selected area.

Certainly, corresponding weights may be set for all parameters in each of the foregoing preset error models, and an example in which weights of the respective parameters is 1 is used for description in this embodiment of this application.

It should be noted that the foregoing steps 201 to 204 are described by using calculating and obtaining a preset error model in real time as an example. In fact, an occasion of obtaining a preset error model is not limited in this embodiment of this application. For example, facial feature point tracking may be performed based on a pre-obtained preset error model, and the pre-obtained preset error model may be obtained by referring to the foregoing steps 201 to 204.

The following steps 205 to 207 are a facial feature point process when the foregoing preset error model is applied.

205: Obtain facial feature points in a previous frame of image of a to-be-tracked frame of image.

In this step, there is a plurality of methods for obtaining facial feature points of a previous frame of image. For example, facial feature points are obtained based on the facial feature point tracking method according to the embodiments of this application. Certainly, if the previous frame of image is the first frame of image obtained by the terminal, facial feature points thereof may be obtained based on a facial feature point tracking method such as a supervised descent method or an incremental learning method.

206: Obtain facial feature point errors between the to-be-tracked frame of image and the previous frame of image based on a preset error model and pixels in the to-be-tracked frame of image, the facial feature point errors indicating differences between first coordinates and second coordinates, the first coordinates being the coordinates of facial feature points in the to-be-tracked frame of image, the second coordinates being the coordinates of facial feature points at corresponding positions in the previous frame of image, and the preset error model being obtained by training facial feature points of a plurality of pairs of adjacent frames of images and being used to indicate relationships between pixels of a latter one of the adjacent frames of images and the facial feature point errors.

The to-be-tracked frame of image is any frame of image following the first frame of image obtained by the terminal. For example, the to-be-tracked frame of image is a frame of image currently captured by the terminal, a frame of image of any video currently played by the terminal, or a frame of image of a specific video stored by the terminal.

Because each class of samples corresponds to respective reconstructed facial feature point errors, the terminal needs to determine, according to the preset error model, a plurality of selected positions, such as the foregoing first position and second position, used in the to-be-tracked frame of image for classifying the sample, determine, according to a pair of pixels at the determined selected positions and a preset threshold, which class of samples the to-be-tracked frame of image is classified into, and select reconstructed facial feature point errors corresponding to the class of samples. Based on the pixels at the respective determined selected positions, the terminal may select a plurality of reconstructed facial feature point errors, and weight respective initial facial feature point errors and the selected reconstructed facial feature point errors, to obtain facial feature point errors between the to-be-tracked frame of image and the previous frame of image. Therefore, the obtained facial feature point errors may represent differences between facial feature points of the to-be-tracked frame of image and facial feature points of the previous frame of image.

Using the foregoing Formula 6 as an example, the terminal may use a pixel in the to-be-tracked frame of image as an independent variable I in the preset error model, input the independent variable I into the preset error model, and obtain a facial feature point error corresponding to the independent variable I output by the preset error model.

In a possible application scenario, because an image often includes more than a face, to avoid interference of other content in the image and obtain facial feature points more accurately, the terminal may first determine a facial area from the to-be-tracked frame of image, and then performs a facial feature point tracking process. To improve efficiency of facial feature point tracking and ensure real-time performance of the tracking process, based on a property that the to-be-tracked frame of image and a previous frame of image are consecutive, the terminal may alternatively determine a facial area in the to-be-tracked frame of image based on second coordinates of facial feature points in the previous frame of image, and obtain facial feature point errors between the to-be-tracked frame of image and the previous frame of image based on pixels in the facial area and the preset error model.

When determining a facial area, the terminal may determine, according to second coordinates of each facial feature point in the previous frame of image, an area boundary enclosed by respective second coordinates in the previous frame of image, and determine a facial area based on the area boundary, for example, determine a central position inside the area boundary, and use a square area of a preset size centered at the central position as a facial area in the to-be-tracked frame of image. The preset size is not limited in this embodiment of this application. For example, the preset size is a size different from a size of the area boundary by a preset value or a specified fixed size.

It should be noted that in addition to determining a facial area based on facial feature points of a previous frame of image, the terminal may alternatively detect a facial area in the to-be-tracked frame of image based on another face detection algorithm such as a neural network-based face detection algorithm or an active contour-based face detection algorithm. Certainly, compared with the complex face detection algorithm in the related technology, the determining method based on facial feature points of a previous frame of image utilizes the facial feature point that are just obtained, and not only can determine a facial area of a current frame conveniently in real time, but also fully uses data obtained in a tracking process, thereby improving a data utilization ratio.

207: Obtain the facial feature points of the to-be-tracked frame of image based on the facial feature points of the previous frame of image and the facial feature point errors.

In this step, the terminal may determine offsets of first coordinates of respective facial feature points in the to-be-tracked frame of image relative to second coordinates of facial feature points in the previous frame of image based on the facial feature point errors obtained in step 207, and obtain first coordinates of the facial feature points in the to-be-tracked frame of image based on the second coordinates of the facial feature points in the previous frame of image and the determined offsets. That is, offsets of first coordinates of respective facial feature points relative to second coordinates are determined based on the facial feature point errors. First coordinates of the facial feature points in the to-be-tracked frame of image are obtained based on the second coordinates of the facial feature points in the previous frame of image and the determined offsets. The terminal may add second coordinates of each facial feature point in the previous frame of image with difference coordinates at a corresponding position in the facial feature point errors, to obtain first coordinates of each facial feature point in the to-be-tracked frame of image. For example, coordinates in the facial feature point errors that have a same label in the previous frame of image are used as coordinates at a corresponding position. Assuming that in facial feature point errors, difference coordinates whose label is 1 are (X3-X4, Y3-Y4), and second coordinates of a facial feature point whose label is 1 in the previous frame of image are (X4, Y4), the two pairs of coordinates are added to obtain coordinates (X3, Y3) that are used as first coordinates of a facial feature point whose label is 1 in the to-be-tracked frame of image. By analogy, first coordinates of each facial feature point of the to-be-tracked frame of image can be obtained.

It should be noted that in this embodiment of the present application, facial feature point tracking may alternatively be performed in combination any current facial feature point tracking method. For example, facial feature points of the to-be-tracked frame of image are determined based on facial feature points of the to-be-tracked frame of image obtained according to each facial feature point tracking method and a weight corresponding to each facial feature point tracking method. In addition, an image may be pre-processed or post-processed when facial feature point tracking is performed, so that the tracked facial feature points are more accurate. For example, noise reduction is performed on the image before the tracking, or a smoothing operation is performed on the image based on smoothing algorithms such as Kalman filtering or an optical flow method after the tracking.

Figure 5:
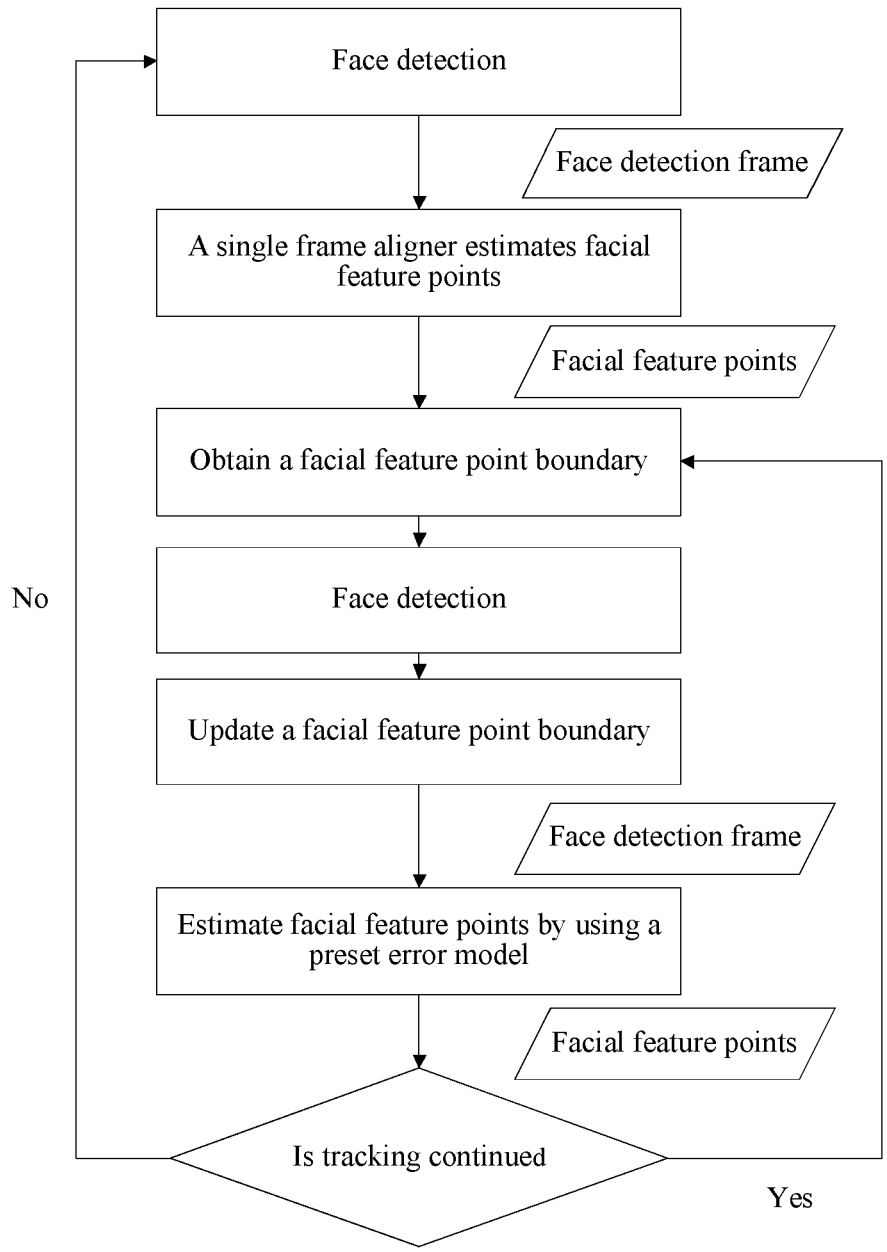
FIG. 5 is a schematic diagram of a facial feature point tracking method according to an embodiment of this application.

The embodiments of this application may be applied to various scenarios in which facial feature point tracking needs to be performed. For example, monitoring of tracking, by a terminal, a facial image captured in real time is used as an example. Referring to FIG. 5, this embodiment of the present application provides a schematic flowchart of a facial feature point tracking method. The tracking process is described by using tracking facial feature points of adjacent frames of images in a video as an example. When the terminal tracks a first frame of image, the terminal first performs face detection to obtain a facial area in a face detection frame, and estimates facial feature points in the facial area by using a single-frame aligner, where the single frame aligner may be any facial feature point tracking model established according to a facial feature point tracking method based on a single frame of image. The terminal may obtain a boundary enclosed by the estimated facial feature points. When the terminal tracks facial feature points in an image following the first frame of image, the terminal may perform face detection based on a facial feature point boundary of a previous frame of image, update a facial feature point boundary in a to-be-tracked frame of image, determine a facial area in the to-be-tracked frame of image based on the updated facial feature point boundary, and estimate facial feature points of the to-be-tracked frame of image based on a preset error model. After facial feature points in a frame of image are estimated, the terminal may determine whether to continue tracking based on a preset tracking condition, if so, may continue to track the next frame of image based on the obtained facial feature point boundary, and if not, may end the tracking process (or may determine a next frame of image as the first frame of image and start a facial feature point tracking process based on the first frame of image determined again). The preset tracking condition is used as a condition for determining whether to continue tracking, and the preset tracking condition is not limited in this embodiment of this application. For example, the preset tracking condition may be a preset tracking duration. If the tracking duration does not reach the preset tracking duration, the tracking is continued. If the tracking duration has reached the preset tracking duration, the tracking process is ended.

In a possible application scenario, since a calculation amount of training a preset error model is large, to save calculation resources of the terminal, the preset error model may alternatively be obtained by a server through training, and the obtained preset error model is sent to the terminal.

In the embodiments of this application, facial feature points in a previous frame of image are obtained, and facial feature point errors between a to-be-tracked frame of image and the previous frame of image may be obtained based on a preset error model and pixels in the to-be-tracked frame of image, and facial feature points of the to-be-tracked frame of image are obtained based on the facial feature points of the previous frame of image and the facial feature point errors. Because facial feature points of adjacent frames of images continuously change, the facial feature points of the to-betracked frame of image may be more accurately estimated by referring to the facial feature points of the previous frame of image. In addition, even though a situation, such as an illumination change or shielding, occurs in the adjacent frames of images, because the facial feature points of the to-be-tracked frame of image can keep consistency with the facial feature points of the previous frame of image, accurate facial feature points may be tracked. Therefore, the tracking method has good robustness.

Figure 6:
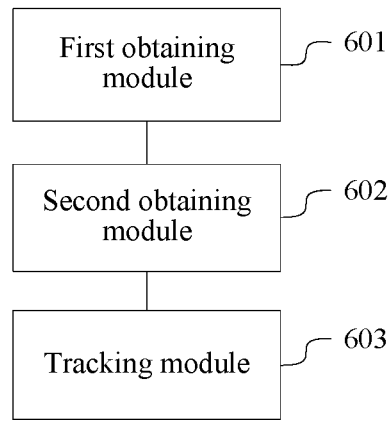
FIG. 6 is a block diagram of a facial feature point tracking apparatus according to an embodiment of this application.

FIG. 6 is a block diagram of a facial feature point tracking apparatus according to an embodiment of this application. Referring to FIG. 6, the apparatus includes:

a first obtaining module 601, configured to obtain facial feature points in a previous frame of image of a to-be-tracked frame of image;

a second obtaining module 602, configured to obtain facial feature point errors between the to-be-tracked frame of image and the previous frame of image based on a preset error model and pixels in the to-be-tracked frame of image, the facial feature point errors indicating differences between first coordinates and second coordinates, the first coordinates being the coordinates of facial feature points in the to-be-tracked frame of image, the second coordinates being the coordinates of facial feature points at corresponding positions in the previous frame of image, and the preset error model being obtained by training facial feature points of a plurality of pairs of adjacent frames of images and being used to indicate relationships between pixels of a latter one of the adjacent frames of images and the facial feature point errors; and a tracking module 603, configured to obtain the facial feature points of the to-be-tracked frame of image based on the facial feature points of the previous frame of image and the facial feature point errors.

In an possible implementation, the tracking module 603 is configured to: determine offsets of first coordinates of respective facial feature points relative to second coordinates based on the facial feature point errors; and obtain first coordinates of the facial feature points in the to-be-tracked frame of image based on the second coordinates of the facial feature points in the previous frame of image and the determined offsets.

Figure 7:
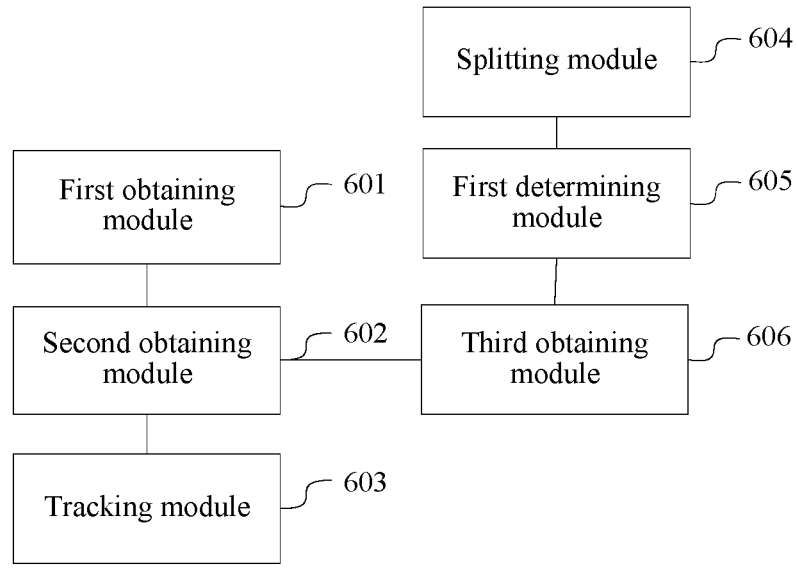
FIG. 7 is a block diagram of a facial feature point tracking apparatus according to an embodiment of this application.

In an possible implementation, based on the apparatus composition of FIG. 6, referring to FIG. 7, the apparatus further includes:

a splitting module 604, configured to split the sample set into a plurality of classes of samples based on a preset threshold and a pair of pixels at selected positions in a selected area in a second image of each sample in the sample set, where each sample in the sample set includes facial feature points of a first image that is a former one and facial feature points of the second image that is a latter one in adjacent frames of images;

a first determining module 605, configured to determine reconstructed facial feature point errors corresponding to each class of samples, where the reconstructed facial feature point errors are used to indicate differences between third coordinates of facial feature points of a second image in a class of samples and estimated facial feature point coordinates, and the estimated facial feature point coordinates are determined based on facial feature points of a first image in the class of samples; and a third obtaining module 606, configured to obtain the preset error model based on the reconstructed facial feature point errors corresponding to each class of samples.

In an possible implementation, the apparatus further includes:

an update module, configured to: for each class of samples, update estimated facial feature points of each second image in the class of samples based on the reconstructed facial feature point errors corresponding to the class of samples before the third obtaining module 606 obtains the preset error model based on the reconstructed facial feature point errors corresponding to each class of samples;

a first selection module, configured to re-select one position in the selected area as the selected position; and a first cycling module, configured to continuously perform the steps of splitting the sample set into a plurality of classes of samples based on a preset threshold and a pair of pixels at selected positions in a selected area in a second image of each sample in the sample set and determining reconstructed facial feature point errors corresponding to each class of samples until the reconstructed facial feature point errors corresponding to each class of samples that is split based on the pair of pixels at respective selected positions are determined.

In an possible implementation, the apparatus further includes:

a second selection module, configured to re-select one area in the sample as the selected area before the third obtaining module 606 obtains the preset error model based on the reconstructed facial feature point errors corresponding to each class of samples; and a second cycling module, configured to continuously perform the steps of splitting the sample set into a plurality of classes of samples based on a preset threshold and a pair of pixels at selected positions in a selected area in a second image of each sample in the sample set and determining reconstructed facial feature point errors corresponding to each class of samples until the reconstructed facial feature point errors corresponding to each class of samples that is split based on the pair of pixels at selected positions in each selected area are determined.

Figure 8:
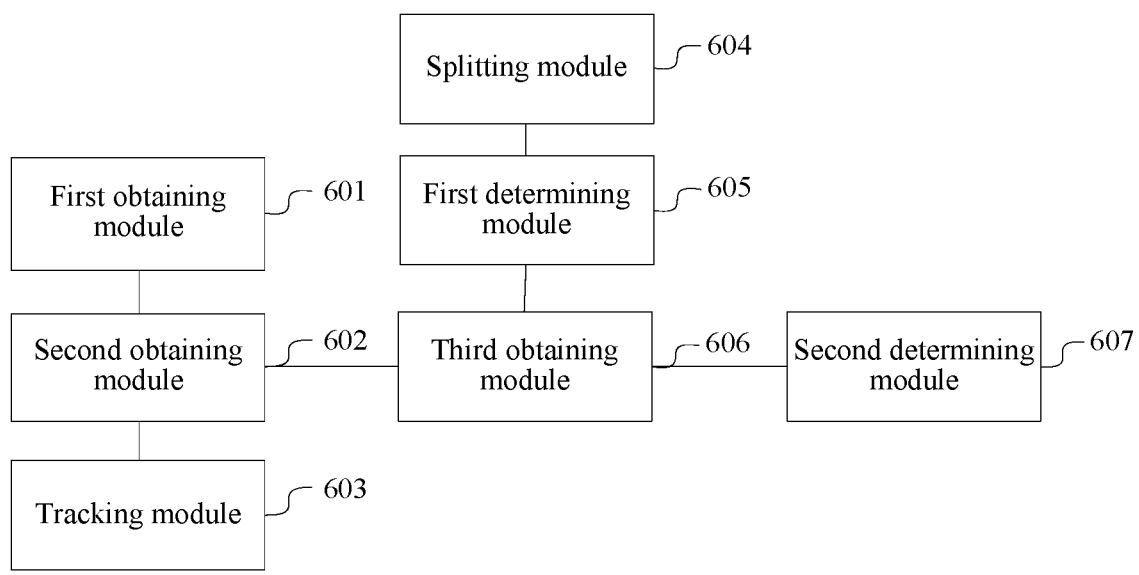
FIG. 8 is a block diagram of a facial feature point tracking apparatus according to an embodiment of this application.

In an possible implementation, based on the apparatus composition of FIG. 7, referring to FIG. 8, the apparatus further includes:

a second determining module 607, configured to determine initial facial feature point errors corresponding to a selected area of the second image, where the initial facial feature point errors are used to indicate the differences between the third coordinates of the facial feature points of the second image and the estimated facial feature point coordinates; and the third obtaining module 606, configured to obtain the preset error model based on the initial facial feature point errors and the reconstructed facial feature point errors corresponding to each class of samples.

In an possible implementation, the splitting module 604 is further configured to split the sample set in different manners based on the preset threshold and a plurality of pairs of pixels at different selected positions in one selected area of the second image in each sample to obtain a plurality of classes of samples in each splitting manner;

determine a splitting purity of each splitting manner based on facial feature points of the plurality of classes of samples in each splitting manner, where the splitting purity is used to indicate a similarity between respective samples in a class of samples in a splitting manner; and select a splitting manner having a splitting purity that meets a preset condition, using a plurality of classes of samples in the splitting manner as the finally obtained plurality of classes of samples, and use positions of a pair of pixels corresponding to the splitting manner as the selected positions.

In an possible implementation, the second obtaining module 602 is further configured to determine a facial area in the to-be-tracked frame of image based on the second coordinates of the facial feature points in the previous frame of image; and obtain facial feature point errors between the to-be-tracked frame of image and the previous frame of image based on pixels in the facial area and the preset error model.

An optional embodiment of this application may be formed by using any combination of all the foregoing optional technical solutions, and details are not described herein again.

It should be noted that when the facial feature point tracking apparatus provided in the foregoing embodiment tracks facial feature points, it is illustrated with an example of division of the foregoing function modules. In practical application, the foregoing functions may be distributed to different function modules according to requirements, that is, the internal structure of the apparatus is divided into different function modules, so as to finish all or part of the functions described above. Furthermore, the embodiment of the facial feature point tracking apparatus provided by the foregoing embodiments belongs to the same idea as the embodiment of the facial feature point tracking method, and the method embodiment may serve as a reference for details of a specific implementation process thereof. Details are not provided herein again.

Figure 9:
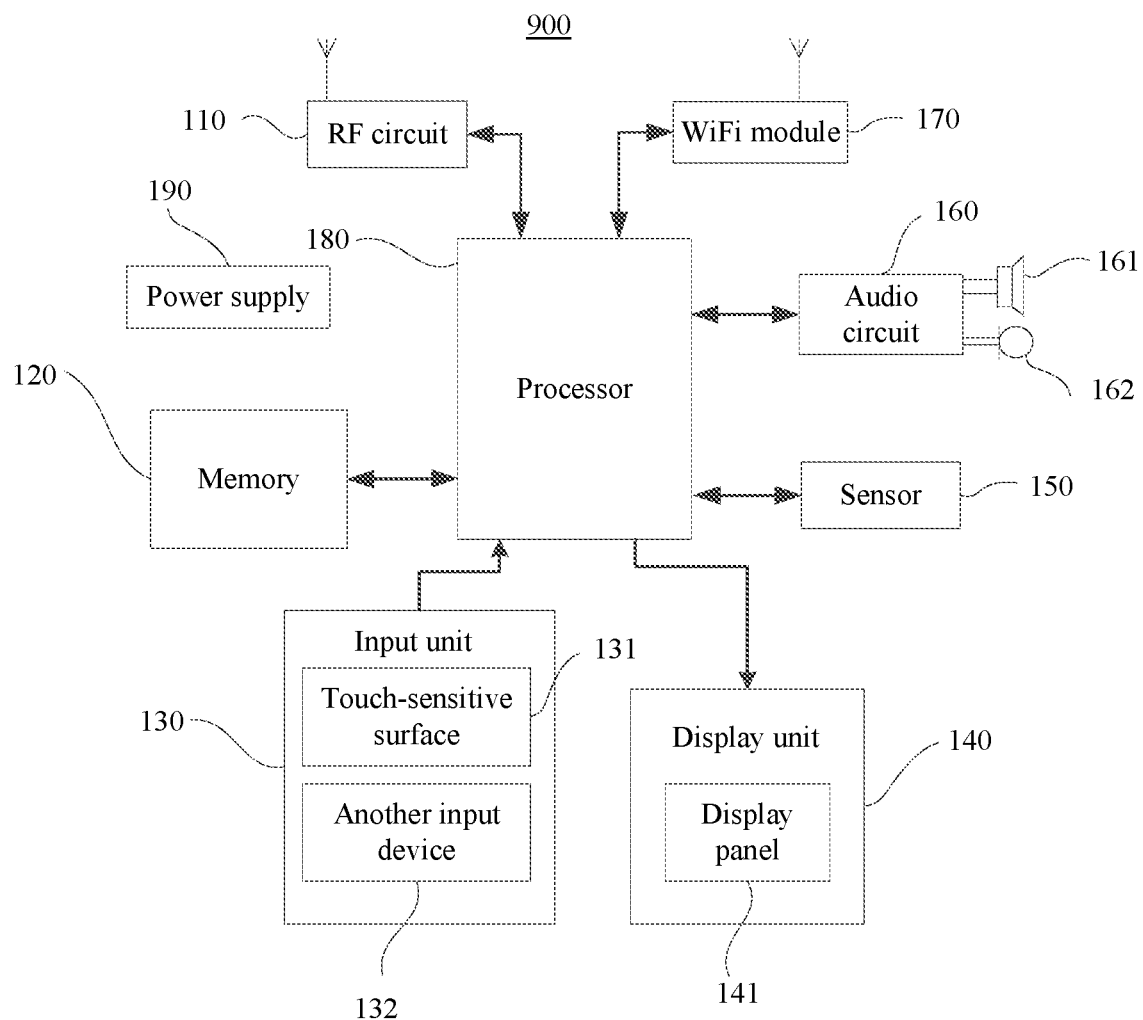
FIG. 9 is a schematic structural diagram of a terminal according to an embodiment of this application.

FIG. 9 is a schematic structural diagram of a terminal according to an embodiment of this application. Referring to FIG. 9, the terminal may be configured to perform the facial feature point tracking method provided by the foregoing embodiments.

The terminal 900 may include components such as a radio frequency (RF) 110, a memory 120 including one or more computer-readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 9 does not constitute a limitation to the terminal, and the terminal may include more components or fewer components than those shown in the figure, or some components may be combined, or a different component deployment may be used.

The RF circuit 110 may be configured to receive and send signals during information receiving and sending or during a call. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may further include a non-volatile memory, such as at least one magnetic disk storage device, a flash memory, or other volatile solid-state storage devices. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. The input unit 130 may include a touch-sensitive surface 131 and another input device 132. The touch-sensitive surface 131, also referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. The another input device 132 may include, but is not limited to: one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900. The graphical user interfaces may be composed of graphics, text, icons, videos, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 141 transfers the touch operation to the processor 180, to determine the type of the touch event. Then, the processor 180 provides a corresponding visual output on the display panel 141 according to the type of the touch event. Although, in FIG. 9, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150 such as an optical sensor, a motion sensor, and other sensors. The optical sensor may include an ambient light sensor and a proximity sensor, where the ambient light sensor may adjust luminance of the display panel 141 according to the luminance of the ambient light, and the proximity sensor may switch off the display panel 141 and/or backlight when the terminal 900 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 900, are not described in detail herein.

The audio circuit 160, a speaker 161, and a microphone 162 may provide audio interfaces between the user and the terminal 900. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 900.

WiFi is a short distance wireless transmission technology. The terminal 900 may help, by using the WiFi module 170, the user to receive and send emails, browse a web page, access streaming media, and so on, which provides wireless broadband Internet access for the user. Although FIG. 9 shows the WiFi circuit 170, it may be understood that the wireless communications unit is not a necessary component of the terminal 900, and when required, the wireless communications unit may be omitted as long as the scope of the essence of this application is not changed.

The processor 180 is a control center of the terminal 900, is connected to various parts of the entire mobile phone by using various interfaces and lines, and by running or executing a software program and/or module stored in the memory 120, perform various functions of the terminal 900 and process data, so as to perform overall monitoring on the mobile phone. Optionally, the processor 180 may include one or more processing cores. For example, the processor 180 may integrate an application processor and a modem. The application processor mainly processes an operating system, a user interface, an application program, and the like. The modem mainly processes wireless communication. It may be understood that the foregoing modem processor may alternatively not be integrated into the processor 180.

The terminal 900 further includes the power supply 190 (such as a battery) for supplying power to the components. For example, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 900 may further include a camera, a Bluetooth module, and the like, which are not described herein. In this embodiment, the display unit of the terminal is a touch screen display. The terminal further includes a memory and one or more programs. The one or more programs are stored in the memory and configured to be executed by one or more processors.

The one or more programs include instructions for performing the following operations: obtaining facial feature points in a previous frame of image of a to-be-tracked frame of image; obtaining facial feature point errors between the to-be-tracked frame of image and the previous frame of image based on a preset error model and pixels in the to-be-tracked frame of image, the facial feature point errors indicating differences between first coordinates and second coordinates, the first coordinates being the coordinates of facial feature points in the to-be-tracked frame of image, the second coordinates being the coordinates of facial feature points at corresponding positions in the previous frame of image, and the preset error model being obtained by training facial feature points of a plurality of pairs of adjacent frames of images and being used to indicate relationships between pixels of a latter one of the adjacent frames of images and the facial feature point errors; and obtaining the facial feature points of the to-be-tracked frame of image based on the facial feature points of the previous frame of image and the facial feature point errors.

The one or more programs further include instructions for performing the following operations: determining offsets of first coordinates of respective facial feature points relative to second coordinates based on the facial feature point errors; and obtaining first coordinates of the facial feature points in the to-be-tracked frame of image based on the second coordinates of the facial feature points in the previous frame of image and the determined offsets.

The one or more programs further include instructions for performing the following operations: splitting the sample set into a plurality of classes of samples based on a preset threshold and a pair of pixels at selected positions in a selected area in a second image of each sample in the sample set, where each sample in the sample set includes facial feature points of a first image that is a former one and facial feature points of the second image that is a latter one in adjacent frames of images; determining reconstructed facial feature point errors corresponding to each class of samples, where the reconstructed facial feature point errors are used to indicate differences between third coordinates of facial feature points of a second image in a class of samples and estimated facial feature point coordinates, and the estimated facial feature point coordinates are determined based on facial feature points of a first image in the class of samples; and obtaining the preset error model based on the reconstructed facial feature point errors corresponding to each class of samples.

The one or more programs further include instructions for performing the following operations: for each class of samples, updating estimated facial feature points of each second image in the class of samples based on the reconstructed facial feature point errors corresponding to the class of samples before the obtaining the preset error model based on the reconstructed facial feature point errors corresponding to each class of samples; re-selecting one position in the selected area as the selected position; and continuously performing the steps of splitting the sample set into a plurality of classes of samples based on a preset threshold and a pair of pixels at selected positions in a selected area in a second image of each sample in the sample set and determining reconstructed facial feature point errors corresponding to each class of samples until the reconstructed facial feature point errors corresponding to each class of samples that is split based on the pair of pixels at respective selected positions are determined.

The one or more programs further include instructions for performing the following operations: re-selecting one area in the sample as the selected area before obtaining the preset error model based on the reconstructed facial feature point errors corresponding to each class of samples; and continuously performing the steps of splitting the sample set into a plurality of classes of samples based on a preset threshold and a pair of pixels at selected positions in a selected area in a second image of each sample in the sample set and determining reconstructed facial feature point errors corresponding to each class of samples, and stopping after determining reconstructed facial feature point errors corresponding to each class of samples split based on a pair of pixels at selected positions in each selected area.

The one or more programs further include instructions for performing the following operations: determining initial facial feature point errors corresponding to a selected area of the second image, where the initial facial feature point errors are used to indicate the differences between the third coordinates of the facial feature points of the second image and the estimated facial feature point coordinates; and the obtaining the preset error model based on the reconstructed facial feature point errors corresponding to each class of samples includes: obtaining the preset error model based on the initial facial feature point errors and the reconstructed facial feature point errors corresponding to each class of samples.

The one or more programs further include instructions for performing the following operations: splitting the sample set in different manners based on the preset threshold and a plurality of pairs of pixels at different selected positions in one selected area of the second image in each sample to obtain a plurality of classes of samples in each splitting manner; determining a splitting purity of each splitting manner based on facial feature points of the plurality of classes of samples in each splitting manner, where the splitting purity is used to indicate a similarity between respective samples in a class of samples in a splitting manner; and selecting a splitting manner having a splitting purity that meets a preset condition, using a plurality of classes of samples in the splitting manner as the finally obtained plurality of classes of samples, and using positions of a pair of pixels corresponding to the splitting manner as the selected positions.

The one or more programs further include instructions for performing the following operations: determining a facial area in the to-be-tracked frame of image based on the second coordinates of the facial feature points in the previous frame of image; and obtaining, based on the preset error model and pixels in the facial area, the facial feature point errors between the to-be-tracked frame of image and the previous frame of image.

Figure 10:
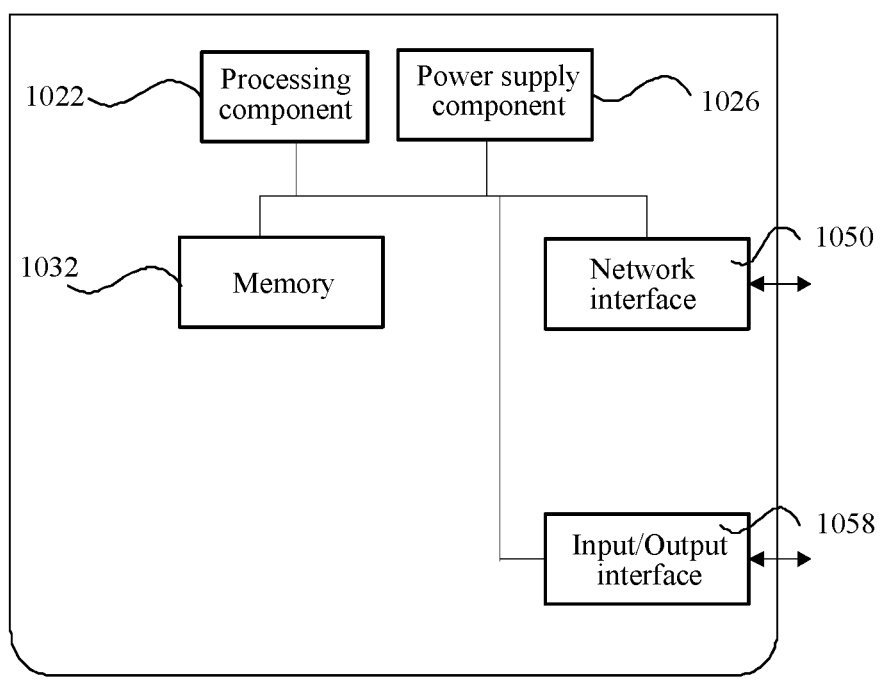
FIG. 10 is a schematic structural diagram of a server according to an embodiment of this application.

FIG. 10 is a schematic structural diagram of a server according to an embodiment of this application. Referring to FIG. 10, the server includes a processing component 1022, and further includes one or more processors and a memory resource represented by a memory 1032. The memory resource is used for storing an instruction that can be executed by the processing component 1022, for example, an application program. The application program stored in the memory 1032 may include one or more programs. In addition, the processing component 1022 is configured to execute instructions.

The server may further include a power supply component 1026, configured to perform power supply management of the server, a wired or wireless network interface 1050, configured to connect the server to a network, and an input/output (I/O) interface 1058. The server may operate an operating system that is stored in the memory 1032, for example, Windows Server®, Mac OS X®, Unix™, Linux®, or FreeBSD™.

The one or more programs include instructions for performing the following operations: obtaining facial feature points in a previous frame of image of a to-be-tracked frame of image; obtaining facial feature point errors between the to-be-tracked frame of image and the previous frame of image based on a preset error model and pixels in the to-be-tracked frame of image, the facial feature point errors indicating differences between first coordinates and second coordinates, the first coordinates being the coordinates of facial feature points in the to-be-tracked frame of image, the second coordinates being the coordinates of facial feature points at corresponding positions in the previous frame of image, and the preset error model being obtained by training facial feature points of a plurality of pairs of adjacent frames of images and being used to indicate relationships between pixels of a latter one of the adjacent frames of images and the facial feature point errors; and obtaining the facial feature points of the to-be-tracked frame of image based on the facial feature points of the previous frame of image and the facial feature point errors.

The one or more programs further include instructions for performing the following operations: determining offsets of first coordinates of respective facial feature points relative to second coordinates based on the facial feature point errors; and obtaining first coordinates of the facial feature points in the to-be-tracked frame of image based on the second coordinates of the facial feature points in the previous frame of image and the determined offsets.

The one or more programs further include instructions for performing the following operations: splitting the sample set into a plurality of classes of samples based on a preset threshold and a pair of pixels at selected positions in a selected area in a second image of each sample in the sample set, where each sample in the sample set includes facial feature points of a first image that is a former one and facial feature points of the second image that is a latter one in adjacent frames of images; determining reconstructed facial feature point errors corresponding to each class of samples, where the reconstructed facial feature point errors are used to indicate differences between third coordinates of facial feature points of a second image in a class of samples and estimated facial feature point coordinates, and the estimated facial feature point coordinates are determined based on facial feature points of a first image in the class of samples; and obtaining the preset error model based on the reconstructed facial feature point errors corresponding to each class of samples.

The one or more programs further include instructions for performing the following operations: for each class of samples, updating estimated facial feature points of each second image in the class of samples based on the reconstructed facial feature point errors corresponding to the class of samples before the obtaining the preset error model based on the reconstructed facial feature point errors corresponding to each class of samples; re-selecting one position in the selected area as the selected position; and continuously performing the steps of splitting the sample set into a plurality of classes of samples based on a preset threshold and a pair of pixels at selected positions in a selected area in a second image of each sample in the sample set and determining reconstructed facial feature point errors corresponding to each class of samples until the reconstructed facial feature point errors corresponding to each class of samples that is split based on the pair of pixels at respective selected positions are determined.

The one or more programs further include instructions for performing the following operations: re-selecting one area in the sample as the selected area before obtaining the preset error model based on the reconstructed facial feature point errors corresponding to each class of samples; and continuously performing the steps of splitting the sample set into a plurality of classes of samples based on a preset threshold and a pair of pixels at selected positions in a selected area in a second image of each sample in the sample set and determining reconstructed facial feature point errors corresponding to each class of samples, and stopping after determining reconstructed facial feature point errors corresponding to each class of samples split based on a pair of pixels at selected positions in each selected area.

The one or more programs further include instructions for performing the following operations: determining initial facial feature point errors corresponding to a selected area of the second image, where the initial facial feature point errors are used to indicate the differences between the third coordinates of the facial feature points of the second image and the estimated facial feature point coordinates; and the obtaining the preset error model based on the reconstructed facial feature point errors corresponding to each class of samples includes: obtaining the preset error model based on the initial facial feature point errors and the reconstructed facial feature point errors corresponding to each class of samples.

The one or more programs further include instructions for performing the following operations: splitting the sample set in different manners based on the preset threshold and a plurality of pairs of pixels at different selected positions in one selected area of the second image in each sample to obtain a plurality of classes of samples in each splitting manner; determining a splitting purity of each splitting manner based on facial feature points of the plurality of classes of samples in each splitting manner, where the splitting purity is used to indicate a similarity between respective samples in a class of samples in a splitting manner; and selecting a splitting manner having a splitting purity that meets a preset condition, using a plurality of classes of samples in the splitting manner as the finally obtained plurality of classes of samples, and using positions of a pair of pixels corresponding to the splitting manner as the selected positions.

The one or more programs further include instructions for performing the following operations: determining a facial area in the to-be-tracked frame of image based on the second coordinates of the facial feature points in the previous frame of image; and obtaining, based on the preset error model and pixels in the facial area, the facial feature point errors between the to-be-tracked frame of image and the previous frame of image.

In an exemplary embodiment, a computer-readable storage medium is further provided. The computer-readable storage medium stores at least one instruction, the instruction being loaded and executed by a processor to perform operations performed in the foregoing facial feature point tracking method. For example, the computer-readable storage medium may be a ROM (Read-Only Memory), a RAM (Random-Access Memory), a CD-ROM (Compact Disc Read-Only Memory), a magnetic tape, a floppy disk and an optical data storage device.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit the present disclosure. Any modification, equivalent replacement, or improvement made within the spirit and principle of the present disclosure shall fall within the protection scope of this application.

What is claimed is:

1. A method for facial feature point tracking, the method comprising:
    acquiring, via interface circuitry of an apparatus, facial feature points of a face in a previous image of a to-be-tracked image in an image sequence;
    obtaining, via processing circuitry of the apparatus, facial feature point errors between the to-be-tracked image and the previous image based on a preset error model and pixels in the to-be-tracked image, the facial feature point errors indicating differences between first coordinates and second coordinates, the first coordinates being coordinates of facial feature points of the face in the to-be-tracked image, the second coordinates being coordinates of facial feature points of the face at corresponding positions in the previous image, and the preset error model being trained based on facial feature points in a plurality of pairs of adjacent reference images, the preset error model being used to indicate a relationship between pixels of a second reference image in a respective pair of adjacent reference images and facial feature point errors between the respective pair of adjacent reference images; and
    determining, via the processing circuitry, the facial feature points of the face in the to-be-tracked image based on the facial feature points of the face in the previous image and the facial feature point errors between the to-be-tracked image and the previous image.

2. The method according to claim 1, wherein the determining comprises:
    determining offsets of the first coordinates of the facial feature points in the previous image relative to the second coordinates of the facial feature points in the to-be-tracked image based on the facial feature point errors; and
    obtaining the first coordinates of the facial feature points of the face in the to-be-tracked image based on the second coordinates of the facial feature points of the face in the previous image and the determined offsets.

3. The method according to claim 1, wherein the method further comprises:
    splitting the plurality of pairs of adjacent reference images into a plurality of sample classes based on a preset threshold and a pair of pixels in a selected position of a selected area from the second reference image of each of the plurality of pairs of adjacent reference images, each of the plurality of sample classes including facial feature points of a first reference image and facial feature points of the second reference image of the plurality of pairs of adjacent reference images in the respective sample class;

determining reconstructed facial feature point errors corresponding to each of the plurality of sample classes, wherein the reconstructed facial feature point errors indicate differences between third coordinates of the facial feature points of the second reference image in each of the plurality of sample classes and estimated facial feature point coordinates, and the estimated facial feature point coordinates are determined based on the facial feature points of the first reference image in each of the plurality of sample classes; and obtaining the preset error model based on the reconstructed facial feature point errors corresponding to each of the plurality of sample classes.

4. The method according to claim 3, before the obtaining the preset error model, further comprising:

updating estimated facial feature points of the second reference image in each of the plurality of sample classes based on the reconstructed facial feature point errors corresponding to the respective sample class;

selecting a preset number of new positions in the selected area for each of the plurality of sample classes; and splitting the plurality of pairs of adjacent reference images into an additional plurality of sample classes according to the selected new positions, and determining corresponding reconstructed facial feature point errors for each of the additional plurality of sample classes.

5. The method according to claim 3, before the obtaining the preset error model, further comprising:

selecting a preset number of new areas in each of the plurality of sample classes as the selected areas; and splitting the plurality of pairs of adjacent reference images into an additional plurality of sample classes according to the selected new areas, and determining corresponding reconstructed facial feature point errors for each of the additional plurality of sample classes.

6. The method according to claim 3, wherein the method further comprises:

determining initial facial feature point errors corresponding to the selected area of the second reference image in each of the plurality of sample classes, wherein the initial facial feature point errors indicate the differences between the third coordinates of the facial feature points of the second reference image and the estimated facial feature point coordinates; and obtaining the preset error model based on the initial facial feature point errors and the reconstructed facial feature point errors corresponding to each of the plurality of sample classes.

7. The method according to claim 3, wherein the splitting comprises:

splitting the plurality of pairs of adjacent reference images according to a plurality of splitting manners based on the preset threshold and a plurality of pixel pairs to obtain a corresponding plurality of sample classes in a respective splitting manner, each of the plurality of pixel pairs being selected at a respective selected position in the selected area of the second reference image in each of the plurality of sample classes;

determining a splitting similarity for each of the plurality of splitting manners based on facial feature points of the corresponding plurality of sample classes in the respective splitting manner, wherein the splitting similarity indicates a similarity between two respective sample classes in one of the corresponding plurality of sample classes in the respective splitting manner; and selecting a splitting manner from the plurality of splitting manners having a splitting similarity that meets a preset condition, applying a corresponding plurality of sample classes in the splitting manner as the plurality of sample classes, and applying a position of a pair of pixels corresponding to the splitting manner as the selected position.

8. The method according to claim 1, wherein the obtaining comprises:

determining a facial area in the to-be-tracked image based on the second coordinates of the facial feature points in the previous image; and obtaining, based on the preset error model and the pixels in the facial area, the facial feature point errors between the to-be-tracked image and the previous image.

9. A facial feature point tracking apparatus, comprising: processing circuitry configured to:

acquire facial feature points of a face in a previous image of a to-be-tracked image in an image sequence;

obtain facial feature point errors between the to-be-tracked image and the previous image based on a preset error model and pixels in the to-be-tracked image, the facial feature point errors indicating differences between first coordinates and second coordinates, the first coordinates being coordinates of facial feature points of the face in the to-be-tracked image, the second coordinates being coordinates of facial feature points of the face at corresponding positions in the previous image, and the preset error model being trained based on facial feature points in a plurality of pairs of adjacent reference images, the preset error model being used to indicate a relationship between pixels of a second reference image in a respective pair of adjacent reference images and facial feature point errors between the respective pair of adjacent reference images; and determine the facial feature points of the face in the to-be-tracked image based on the facial feature points of the face in the previous image and the facial feature point errors between the to-be-tracked image and the previous image.

10. The apparatus according to claim 9, wherein the processing circuitry is further configured to:

determine offsets of the first coordinates of the facial feature points in the previous image relative to the second coordinates of the facial points in the to-be-tracked image based on the facial feature point errors; and obtain the first coordinates of the facial feature points of the face in the to-be-tracked image based on the second coordinates of the facial feature points of the face in the previous image and the determined offsets.

11. The apparatus according to claim 9, wherein the processing circuitry is further configured to:

split the plurality of pairs of adjacent reference images into a plurality of sample classes based on a preset threshold and a pair of pixels in a selected position of a selected area from the second reference image of each of the plurality of pairs of adjacent reference images, each of the plurality of sample classes including facial feature points of a first reference image and facial feature points of the second reference image of the plurality of pairs of adjacent reference images in the respective sample class;

determine reconstructed facial feature point errors corresponding to each of the plurality of sample classes, wherein the reconstructed facial feature point errors indicate differences between third coordinates of the facial feature points of the second reference image in each of the plurality of sample classes and estimated facial feature point coordinates, and the estimated facial feature point coordinates are determined based on the facial feature points of the first reference image in each of the plurality of sample classes; and obtain the preset error model based on the reconstructed facial feature point errors corresponding to each of the plurality of sample classes.

12. The apparatus according to claim 11, before obtain the preset error model, wherein the processing circuitry is further configured to:

update estimated facial feature points of the second reference image in each of the plurality of sample classes based on the reconstructed facial feature point errors corresponding to the respective sample class;

select a preset number of new positions in the selected area for each of the plurality of sample classes; and split the plurality of pairs of adjacent reference images into an additional plurality of sample classes according to the selected new positions, and determine corresponding reconstructed facial feature point errors for each of the additional plurality of sample classes.

13. The apparatus according to claim 11, before obtain the preset error model, wherein the processing circuitry is further configured to:

select a preset number of new areas in each of plurality of sample classes as the selected areas; and split the plurality of pairs of adjacent reference images into an additional plurality of sample classes according to the selected new areas, and determining corresponding reconstructed facial feature point errors for each of the additional plurality of sample classes.

14. The apparatus according to claim 11, wherein the processing circuitry is further configured to:

determine initial facial feature point errors corresponding to the selected area of the second reference image in each of the plurality of sample classes, wherein the initial facial feature point errors indicate the differences between the third coordinates of the facial feature points of the second reference image and the estimated facial feature point coordinates; and obtain the preset error model based on the initial facial feature point errors and the reconstructed facial feature point errors corresponding to each of the plurality of sample classes.

15. The apparatus according to claim 11, wherein the processing circuitry is further configured to:

split the plurality of pairs of adjacent reference images according to a plurality of splitting manners based on the preset threshold and a plurality of pixel pairs obtain a corresponding plurality of sample classes in a respective splitting manner, each of the plurality of pixel pairs being selected at a respective selected position in the selected area of the second reference image in each of the plurality of sample classes;

determine a splitting similarity for each of the plurality of splitting manners based on facial feature points of the corresponding plurality of sample classes in the respective splitting manner, wherein the splitting similarity indicates a similarity between two respective sample classes in one of the corresponding plurality of sample classes in the respective splitting manner; and select a splitting manner from the plurality of splitting manners having a splitting similarity that meets a preset condition, apply a corresponding plurality of sample classes in the splitting manner as the plurality of sample classes, and apply a position of a pair of pixels corresponding to the splitting manner as the selected position.

16. The apparatus according to claim 9, wherein the processing circuitry is further configured to:

determine a facial area in the to-be-tracked image based on the second coordinates of the facial feature points in the previous image; and obtain, based on the preset error model and the pixels in the facial area, the facial feature point errors between the to-be-tracked image and the previous image.

17. A non-transitory computer-readable medium storing instructions which when executed by a computer cause the computer to perform:

acquiring facial feature points of a face in a previous image of a to-be-tracked image in an image sequence;

obtaining facial feature point errors between the to-be-tracked image and the previous image based on a preset error model and pixels in the to-be-tracked image, the facial feature point errors indicating differences between first coordinates and second coordinates, the first coordinates being coordinates of facial feature points of the face in the to-be-tracked image, the second coordinates being coordinates of facial feature points of the face at corresponding positions in the previous image, and the preset error model being trained based on facial feature points in a plurality of pairs of adjacent reference images, the preset error model being used to indicate a relationship between pixels of a second reference image in a respective pair of adjacent reference images and facial feature point errors between the respective pair of adjacent reference images; and determining the facial feature points of the face in the to-be-tracked image based on the facial feature points of the face in the previous image and the facial feature point errors between the to-be-tracked image and the previous image.

18. The non-transitory computer-readable medium according to claim 17, wherein the determining comprises:

determining offsets of the first coordinates of the facial feature points in the previous image relative to the second coordinates of the facial feature points in the to-be-tracked image based on the facial feature point errors; and obtaining the first coordinates of the facial feature points of the face in the to-be-tracked image based on the second coordinates of the facial feature points of the face in the previous image and the determined offsets.

19. The non-transitory computer-readable medium according to claim 17, wherein the instructions cause the computer to further perform:

splitting the plurality of pairs of adjacent reference images into a plurality of sample classes based on a preset threshold and a pair of pixels in a selected position of a selected area from the second reference image of each of the plurality of pairs of adjacent reference images, each of the plurality of sample classes including facial feature points of a first reference image and facial feature points of the second reference image of the plurality of pairs of adjacent reference images in the respective sample class;

determining reconstructed facial feature point errors corresponding to each of the plurality of sample classes, wherein the reconstructed facial feature point errors indicate differences between third coordinates of the facial feature points of the second reference image in each of the plurality of sample classes and estimated facial feature point coordinates, and the estimated facial feature point coordinates are determined based on the facial feature points of the first reference image in each of the plurality of sample classes; and obtaining the preset error model based on the reconstructed facial feature point errors corresponding to each of the plurality of sample classes.

20. The non-transitory computer-readable medium according to claim 19, wherein, before the obtaining the preset error model, the instructions cause the computer to further perform:

updating estimated facial feature points of the second reference image in each of the plurality of sample classes based on the reconstructed facial feature point errors corresponding to the respective sample class;

selecting a preset number of new positions in the selected area for each of the plurality of sample classes; and splitting the plurality of pairs of adjacent reference images into an additional plurality of sample classes according to the selected new positions, and determining corresponding reconstructed facial feature point errors for each of the additional plurality of sample classes.

\* \* \* \* \*